US006539365B1

(12) United States Patent
Kutsumi et al.

(10) Patent No.: US 6,539,365 B1
(45) Date of Patent: Mar. 25, 2003

(54) FUZZY INFERENCE METHOD AND MACHINE

(75) Inventors: Hiroshi Kutsumi, Moriguchi (JP); Jun Ozawa, Nara (JP); Kouji Miura, Matsubara (JP); Satoshi Matsuura, Osaka (JP); Takeshi Imanaka, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/170,637

(22) Filed: Oct. 13, 1998

(30) Foreign Application Priority Data

Oct. 13, 1997 (JP) .............................. 9-278389
Feb. 5, 1998 (JP) ........................... 10-024347

(51) Int. Cl.⁷ .............................................. G06N 7/02
(52) U.S. Cl. ................... 706/8; 706/2; 706/25; 706/61; 706/62; 382/149
(58) Field of Search ............... 382/149; 706/2, 706/25, 61, 62

(56) References Cited

U.S. PATENT DOCUMENTS

| 5,255,344 | A | * | 10/1993 | Takagi et al. | 706/25 |
| 5,263,120 | A | * | 11/1993 | Bickel | 706/62 |
| 5,487,130 | A | * | 1/1996 | Ichimori et al. | 706/61 |
| 5,544,256 | A | * | 8/1996 | Brecher et al. | 382/149 |
| 5,579,439 | A | * | 11/1996 | Khan | 706/2 |
| 5,594,835 | A | * | 1/1997 | Rahman et al. | 706/2 |

FOREIGN PATENT DOCUMENTS

JP         6-54165         2/1994

OTHER PUBLICATIONS

Wu C.J. et al., "A General Purpose Fuzzy Controller For Monotone Functions", vol. 26, No. 5, Oct., 1996, pp. 803–808, XP000626938.

European Search Report dated May 10, 2001, application No. EP98119223.

XP 000626938 "IEEE Translations On Systems, Man, and Cybernetics_Part B: Cybernetics" vol. 26. No. 5 Oct. 1996; C. J. Wu and A. H. Sung.

European Search Report for EP 98 11 9223, Jan. 30, 2001.

K. Miura et al., "A User Model Construction for WWW Kansei Retrieval System KiSS", IPS HI Report, 96–HI69–4, pp. 25–32 (1996).

James C. Bezdek, "Pattern Recognition with Fuzzy Objective Function Algorithms", *Plenum Press*, 1982.

* cited by examiner

Primary Examiner—Wilbert L. Starks, Jr.
(74) Attorney, Agent, or Firm—RatnerPrestia

(57) ABSTRACT

An image production method has steps of:
  a detecting one or more descriptive regions exclusive of a background portion of a manuscript;
  calculating an image characteristic value of said descriptive region;
  selecting one from a plurality of previously defined layout patterns based on said determined image characteristic value, the layout pattern including information at least about a position of the descriptive region; and
  producing an image by laying out an image of said manuscript descriptive region or images of an illustration and said manuscript descriptive region according to the decided layout pattern.

8 Claims, 38 Drawing Sheets

POSITION OF SUPERIMPOSED
                  ILLUSTRATION

NUMBER OF ILLUSTRATIONS 3

ILLUSTRATION 1 : x=100,y=150
ILLUSTRATION 2 : x=200,y=150
                    ⋮

SUPERIMPOSITION AREA FOR
DESCRIPTIVE REGION IMAGE
50< x < 750, 200< ,y < 900

POSITION OF SUPERIMPOSED
DESCRIPTIVE REGION IMAGE

POSITION AND TYPE
OF ILLUSTRATION

POSITION OF SUPERIMPOSED
DESCRIPTIVE REGION

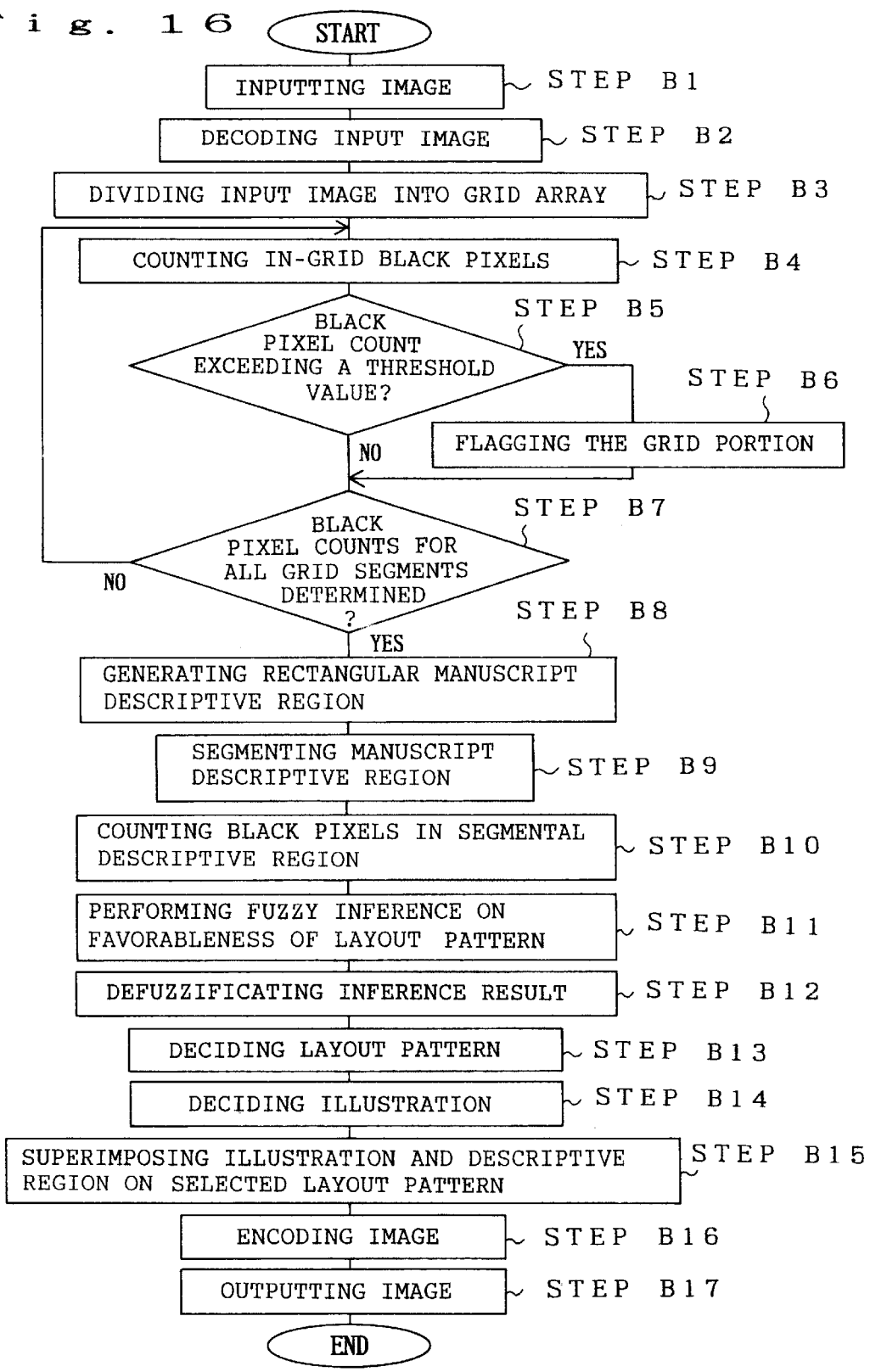

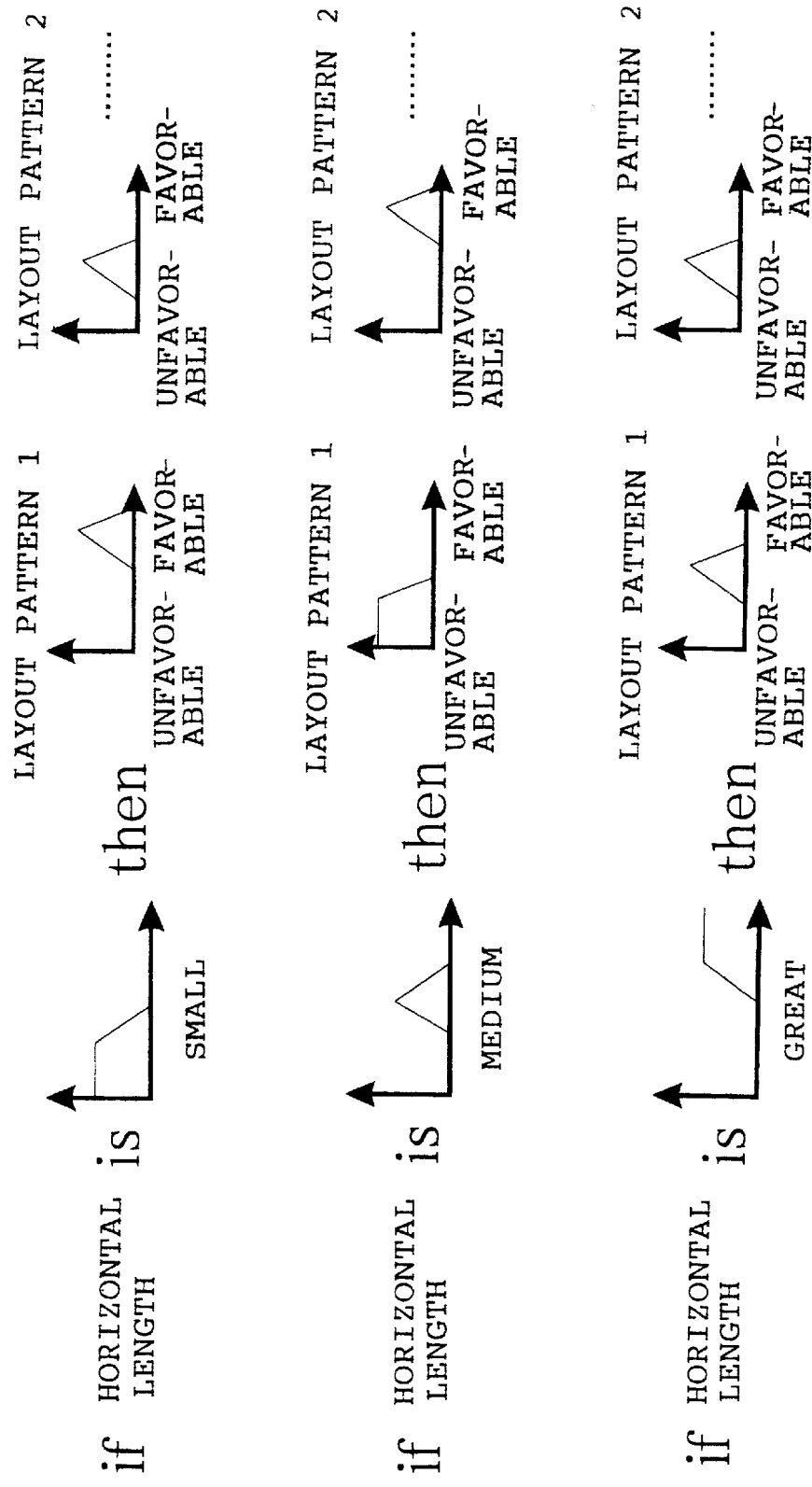

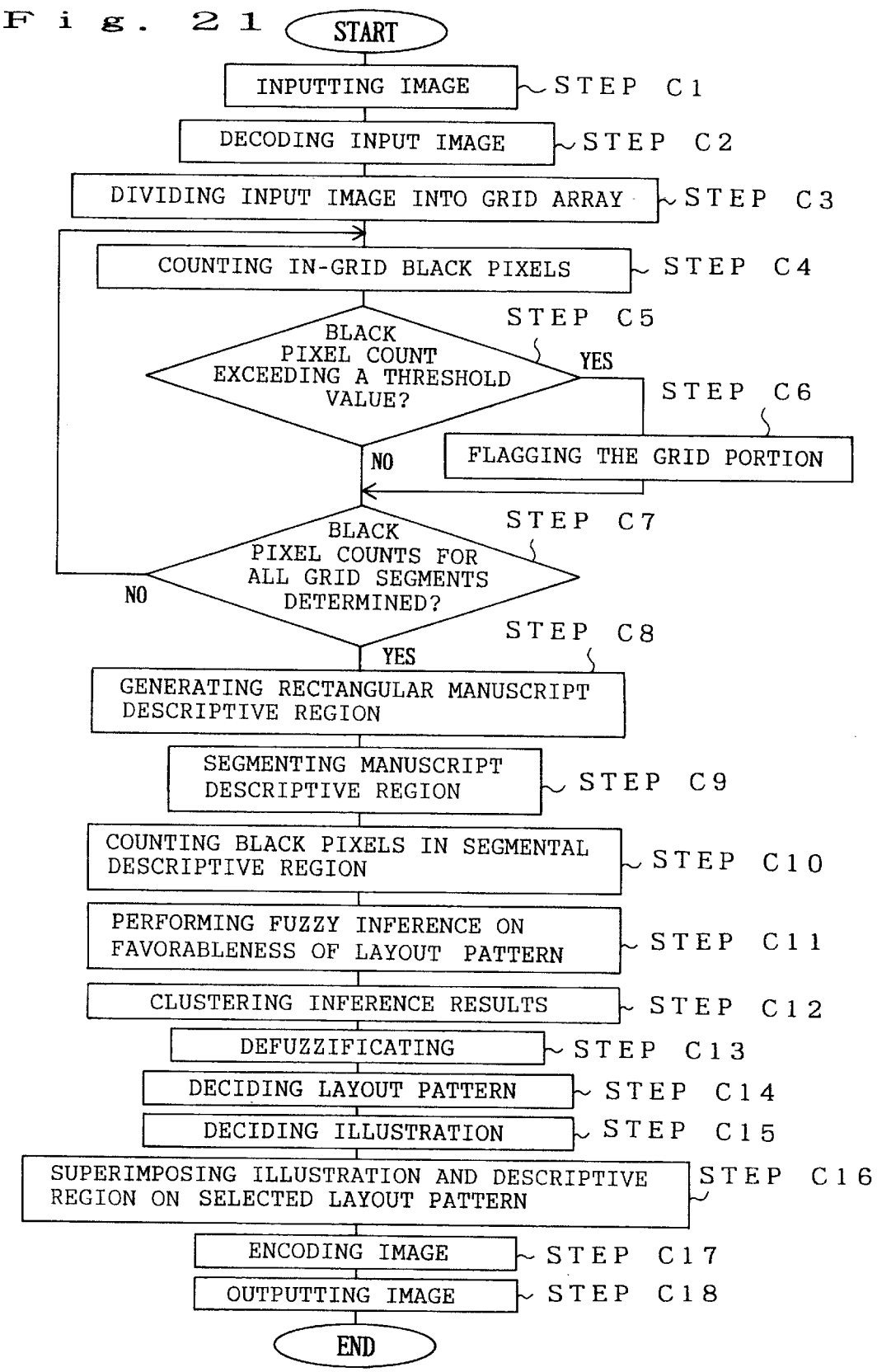

Fig. 25(a)     Fig. 25(b)
APPROXIMATE POSITION OF
SUPERIMPOSED ILLUSTRATION
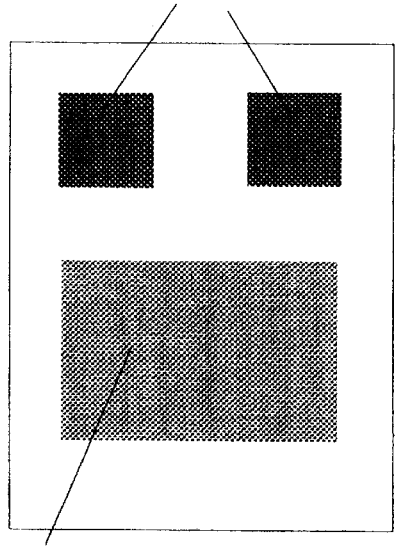
NUMBER OF ILLUSTRATIONS: 2
  ILLUSTRATION 1:
       $50<x<100, 80<y<150$
  ILLUSTRATION 2:
       $150<x<200, 80<y<150$
  DESCRIPTIVE REGION IMAGE : $30<x<600$
       $200<y<700$
POSITION OF SUPERIMPOSED
  DESCRIPTIVE REGION
Fig. 26
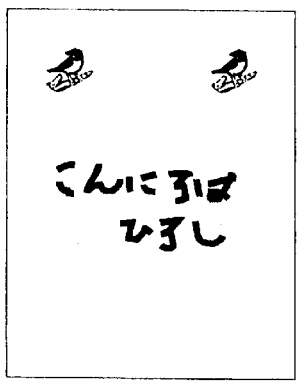 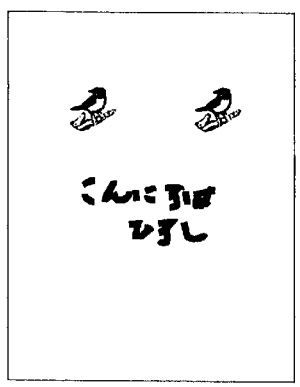 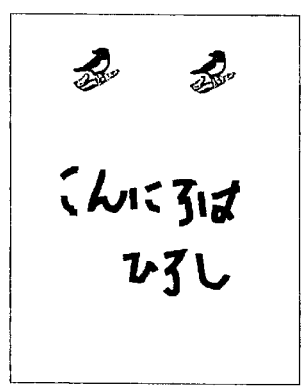

SCHEMATIC LAYOUT PATTERN    SEGMENTAL LAYOUT PATTERN

Fig. 33
| |  1 |  2 |  3 |  4 |
|---|---|---|---|---|
|  1 | – | 0.2 | 0.8 | 0.6 |
|  2 | 0.2 | – | 0.3 | 0.7 |
|  3 | 0.8 | 0.3 | – | 0.3 |
|  4 | 0.6 | 0.7 | 0.3 | – |

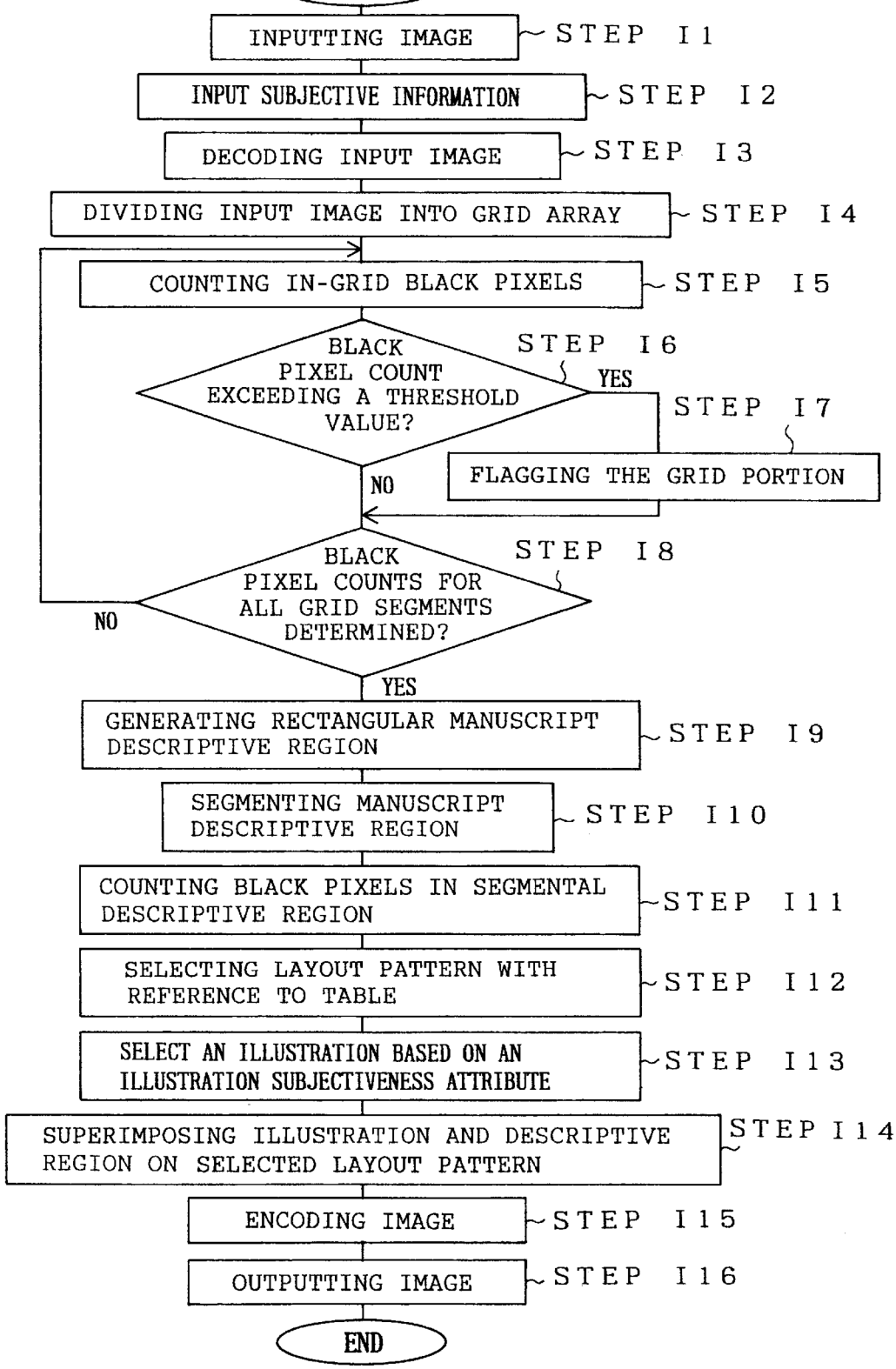

FUZZY INFERENCE METHOD AND MACHINE

BACKGROUND OF THE INVENTION

1. Field of the Invention

The present invention relates generally to a document production system and the like for providing easy production of a document with an illustration or vignette.

2. Related Art of the Invention

Recently, home fax machines have spring into wide use to increase fax communications for purposes other than business. In addition, personal computers and PDAs (portable digital assistance) facilitate transmission or reception of fax data. These devices permit documents produced by users to be readily transmitted to others. However, handwritten documents without illustration or documents containing only text produced by means of the personal computer or the like are prosaic and dull, far from grabbing someone's attention. Hence, a demand exists for a technique of permitting a simple operation to add illustrations or the like to the documents.

An image production system offering such a technique has been proposed in Japanese Unexamined Patent Publication No.6(1994)-54165. This system includes, as shown in FIG. 38, an image data input section 201 for optically reading an image of a manuscript, a paint menu setting section 202 for setting a type and the like of an image to be superimposed, a paint address setting section 203 for specifying a position of the image to be superimposed, a data synthesizing section 204 for combining the manuscript image and the image to be superimposed, and an image output section 205 for outputting a composite image.

With such an arrangement, the image production system permits a user to select a suitable image, such as an illustration, and to specify a position of the image to be combined with the manuscript image read by a scanner or the like, so as to superimpose the illustration and the manuscript image on the specified places for outputting the resultant composite image.

In the image production system of Japanese Unexamined Patent Publication No.6-54165, however, the user is responsible for all the process of selecting the image to be superimposed, such as an illustration, and specifying the layout of the document, thus going through all the cumbersome operations. Hence, it is not easy for everyone to produce a document with an illustration added thereto.

Hence, a demand exists for a document production method and system which require the user of substantially no operation for producing documents wherein illustrations are added to inputted manuscript. There also exists a need for an effective inference scheme for accomplishing such intellectual and complicated operations.

SUMMARY OF THE INVENTION

In view of the foregoing, it is an object of the present invention to provide a method of and system providing easy superimposition of illustrations and the like.

A fuzzy inference method for inference based on fuzzy rules stated in the if-then form, of the present invention comprises the steps of:

clustering inference results prior to dufuzzificating the inference results, and defuzzificating each unit of inference results clustered through the clustering procedure thereby obtaining at least one real value.

A fuzzy inference machine of the present invention comprises:

fuzzy rule storage means for storing fuzzy rules;

fuzzy inference means for performing fuzzy inference based on the fuzzy rules stored in said fuzzy rule storage means;

clustering means for clustering inference results given by said fuzzy inference means; and defuzzificating means for defuzzificating a unit of inference results clustered by said clustering means.

An image production method of the present invention comprises the steps of:

detecting one or more descriptive regions exclusive of a background portion of a manuscript; calculating an image characteristic value of said descriptive region;

selecting one from a plurality of previously defined layout patterns based on said determined image characteristic value, the layout pattern including information at least about a position of the descriptive region; and producing an image by laying out an image of said manuscript descriptive region or images of an illustration and said manuscript descriptive region according to the decided layout pattern.

An image production method of the present invention comprises the steps of:

detecting, based on manuscript data, only an image of a descriptive region exclusive of a background portion of a manuscript;

calculating at least one of image characteristic values of a horizontal length, a vertical length, a mean pixel luminance, a color tone, a luminance distribution and a luminance centroid of said descriptive region;

selecting one from a plurality of previously defined layout patterns based on said determined image characteristic value, the layout pattern including at least one of information items about a number of illustrations, a size of an illustration, a position of the illustration and a position of the manuscript descriptive region; and producing an image by laying out respective images of the illustration and said manuscript descriptive region according to the decided layout pattern.

An image production system of the present invention comprises:

descriptive region detecting means for detecting, based on manuscript data, only an image of a descriptive region exclusive of a background portion of a manuscript;

image characteristic value calculating means for calculating at least one of image characteristic values of a horizontal length, a vertical length, a mean pixel luminance, a color tone, a luminance distribution and a luminance centroid of the descriptive region detected by said descriptive region detecting means;

layout pattern storage means for storing a layout pattern including at least one of information items about a number of illustrations, a size of an illustration, a position of the illustration, and a position of the manuscript descriptive region;

layout pattern selecting means for selecting a layout pattern based on the image characteristic value determined by said image characteristic value calculating means;

illustration storage means for storing the illustrations; and superimposing means for combining the illustration stored in said illustration storage means with the image of said descriptive region according to the layout pattern selected by said layout pattern selecting means.

An image production method of the present invention comprises the steps of:

detecting, based on manuscript data, only an image of a descriptive region exclusive of a background portion of a manuscript;

calculating at least one of image characteristic values of a horizontal length, a vertical length, a mean pixel luminance, a color tone, a luminance distribution and a luminance centroid of said descriptive region image;

selecting, based on said determined image characteristic value, one from a plurality of previously defined schematic layout patterns including at least one of information items about a number of illustrations, an approximate position of an illustration and an approximate position of the descriptive region image;

schematically laying at positions said image of the manuscript descriptive region and said illustration according to the decided schematic layout pattern; and making fine adjustment of the positions of the illustration and the manuscript descriptive region image based on said image characteristic value and then producing an image.

An image production system of the present invention comprises:

descriptive region detecting means for detecting, based on manuscript data, only an image of a descriptive region exclusive of a background portion of a manuscript;

image characteristic value calculating means for calculating at least one of image characteristic values of a horizontal length, a vertical length, a mean pixel luminance, a color tone, a luminance distribution and a luminance centroid of the descriptive region image detected by said descriptive region detecting means;

schematic layout pattern storage means for storing a schematic layout pattern including at least one of information items about a number of illustrations, an approximate position of an illustration and an approximate position of the manuscript descriptive region image;

schematic layout pattern selecting means for selecting a schematic layout pattern based on the image characteristic value determined by said image characteristic value calculating means;

layout fine adjustment means for deciding a precise layout positions in the schematic layout pattern based on the image characteristic value determined by said image characteristic value calculating means, the schematic layout pattern selected by said schematic layout pattern selecting means;

illustration storage means for storing the illustrations; and superimposing means for combining the illustration stored in said illustration storage means with said image of the descriptive region according to the layout decided by said layout fine adjustment means.

An image production method of the present invention comprises the steps of:

detecting, based on manuscript data, only an image of a descriptive region exclusive of a background portion of a manuscript;

calculating at least one of image characteristic values of a horizontal length, a vertical length, a mean pixel luminance, a color tone, a luminance distribution and a luminance centroid of said descriptive region image;

selecting, based on said determined image characteristic value, one from a plurality of previously defined schematic layout patterns including at least one of information items about an approximate position of an illustration and an approximate position of the manuscript descriptive region image;

selecting, based on said image characteristic value, one from a plurality of previously defined segmental layout patterns to be laid in an area of illustration superimposed on the decided schematic layout pattern, the segmental layout pattern including at least one of information items about a number of illustrations, a size of an illustration and a position of the illustration; and laying out the illustration and the image of the descriptive region according to the decided schematic layout pattern and segmental layout pattern for combining the illustration with the image of the manuscript descriptive region.

An image production system of the present invention comprises:

descriptive region detecting means for detecting, based on manuscript data, only an image of a descriptive region exclusive of a background portion of a manuscript;

image characteristic value calculating means for calculating at least one of image characteristic values of a horizontal length, a vertical length, a mean pixel luminance, a color tone, a luminance distribution and a luminance centroid of the descriptive region image detected by said descriptive region detecting means;

schematic layout pattern storage means for storing a schematic layout pattern including at least one of information items about an approximate position of an illustration and an approximate position of the manuscript descriptive region image;

schematic layout pattern selecting means for selecting said schematic layout pattern based on the image characteristic value determined by said image characteristic value calculating means;

segmental layout pattern storage means for storing a segmental layout pattern including at least one of information items about a number of illustrations, a size of an illustration and a position of the illustration;

segmental layout pattern selecting means for selecting said segmental layout pattern based on the image characteristic value determined by said image characteristic value calculating means;

illustration storage means for storing the illustrations; and superimposing means for combining the illustration stored in said illustration storage means with said image of the descriptive region according to the layout selected by said segmental layout pattern selecting means.

BRIEF DESCRIPTION OF THE DRAWINGS

FIG. 16 is a flow chart representing steps of an image producing procedure according to the second embodiment hereof;

FIG. 17 is a diagram illustrating fuzzy rules according to the second embodiment hereof;

FIG. 21 is a flow chart representing steps of an image producing procedure according to the third embodiment hereof;

FIG. 25 is a diagram showing a layout pattern according to the fourth embodiment hereof;

FIG. 26 is a diagram showing exemplary outputs according to the fourth embodiment hereof;

FIG. 33 is a diagram showing a correlation matrix of illustrations according to the sixth embodiment hereof;

FIG. 43 is a flow chart representing steps of an image producing procedure according to the eleventh embodiment hereof.

DETAILED DESCRIPTION OF PREFERRED EMBODIMENTS

Now the preferred embodiments of the invention will hereinbelow be described with reference to the accompanying drawings.

First Embodiment

Figure 1:
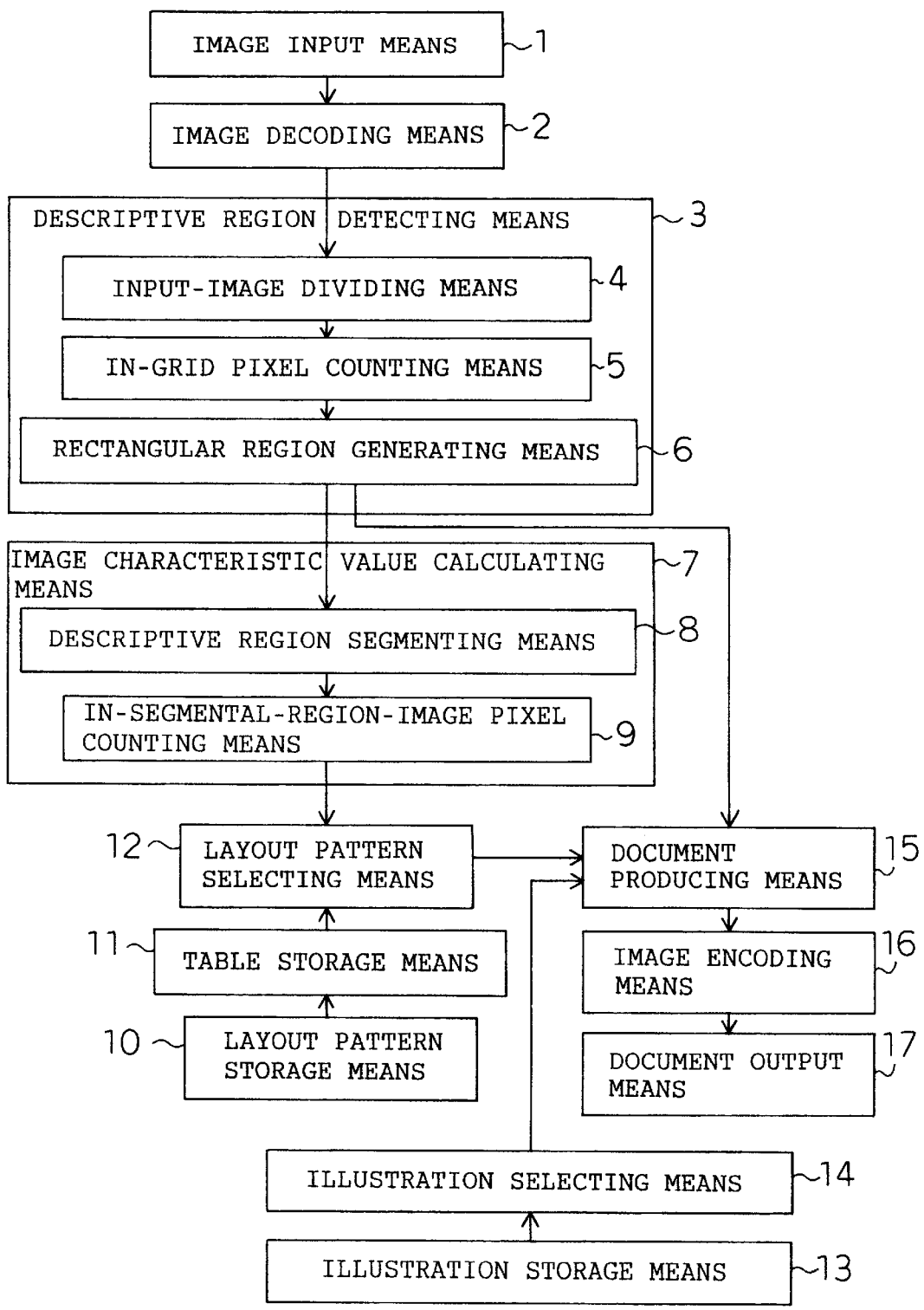
FIG. 1 is a block diagram showing a system arrangement according to a first embodiment of the invention.

FIG. 1 is a block diagram showing an arrangement of an image production method and system according to a first embodiment of the invention. Referring to the figure, the system includes image input means 1 for inputting an image; image decoding means 2 for expanding the image data inputted by the image input means into a bitmap image; descriptive region detecting means 3 for detecting only an image of a descriptive region exclusive of a background portion of the bitmap image generated by the image decoding means 2; input-image dividing means 4 for dividing the input image in a grid form; in-grid pixel counting means 5 for counting a number of pixels included in one grid portion and forming an image of a different color from the background image; rectangular region generating means 6 for detecting, as the descriptive region image, a rectangular region including all grid portions in which a count of pixels exceeds a threshold value; image characteristic value calculating means 7 for calculating, as image characteristic values, a horizontal length, a vertical length, a mean pixel luminance and a luminance distribution of the descriptive region image detected by the descriptive region detecting means; descriptive region segmenting means 8 for segmenting the descriptive region image into at least two segments; in-segmental-descriptive-region-image pixel counting means 9 for counting a number of pixels of each segmental region, which pixels form an image of a color different from the background image; layout pattern storage means 10 for storing a layout pattern of a manuscript; table storage means 11 for storing a table used for deciding a manuscript layout; layout pattern selecting means 12 for selecting a layout pattern of the manuscript; illustration storage means 13 for storing illustration data; illustration selecting means 14 for selecting an illustration; document producing means 15 serving to combine the selected layout pattern, the selected illustration and the descriptive region image together for production of the document; image encoding means 16 for encoding the bitmap image of the produced document into a form for storage or output; and document output means 17 for outputting an image of the encoded document.

The input-image dividing means 4, in-grid pixel counting means 5 and rectangular region generating means 6 constitute the descriptive region detecting means 3. The descriptive region segmenting means 8 and in-segmental-descriptive-region-image pixel counting means 9 constitute the image characteristic value calculating means 7.

Figure 2:
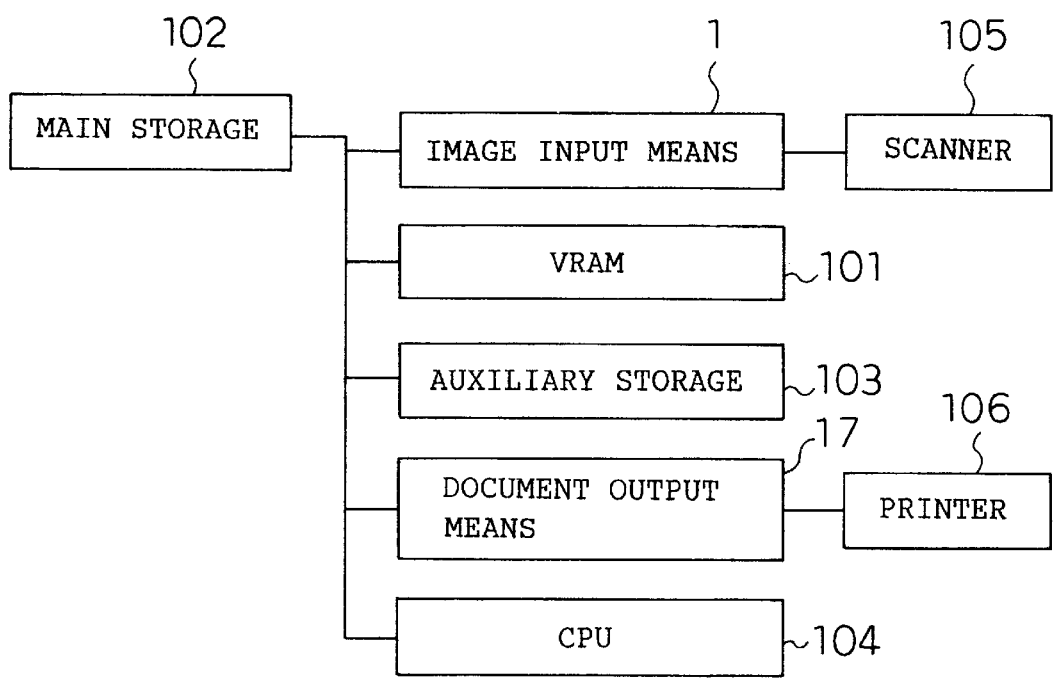
FIG. 2 is a block diagram showing an exemplary hardware construction of the system according to the first embodiment hereof.

FIG. 2 diagrammatically illustrates a hardware construction for carrying out the system of the above arrangement.

The construction of FIG. 2 is essentially the same with that of the general-purpose computer system. In addition, this construction includes identical components to those of the system arrangement of FIG. 1. Therefore, such components are represented by like reference numerals and the description thereof is omitted.

Referring to FIG. 2, the construction includes the image input means 1, the document output means 17, a VRAM 101 for storing data to be displayed/outputted, a main storage 102 composed of a volatile memory for storing a program, an auxiliary storage 103 composed of a nonvolatile memory for storing a program and data, a CPU 104 for executing the program stored in the main storage 102, a scanner 105 for optically reading the manuscript, and a printer 106 for printing the outputted document.

As described above, the hardware is essentially constructed the same way as the computer system wherein the program stored in the auxiliary storage 103 is loaded into the main storage 102 and then executed by the CPU 104.

The image production method and operations of the system arranged as described above will be described with reference to the flow chart shown in FIG. 3.

(Step A1)

Figure 4:
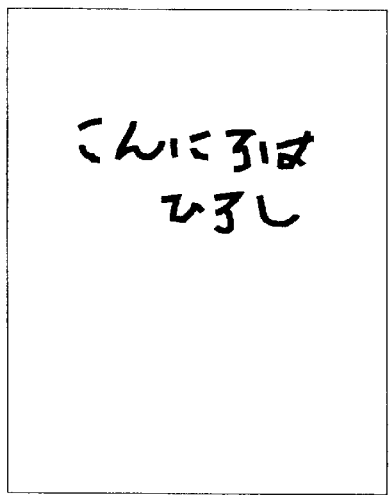
FIG. 4 is a diagram showing an input manuscript used in the first embodiment hereof.

First, the manuscript image read by the scanner 105 is inputted in the image input means 1. It is hereinafter assumed that the input image has a white background and a size of A4. As shown in FIG. 4, a text and the like are written on the A4 sheet.

(Step A2)

The image decoding means 2 serves to decode the image inputted at STEP A1 into a bitmap image. In the case of an A4 manuscript image inputted at a resolution of 100 DPI (dot per inch), the bitmap image has a horizontal length of 864 dots and a vertical length of 1080 dots. It is assumed hereinafter that the image is of a white/black binary image in which a white pixel is represented by 0 and a black pixel is represented by 1.

Figure 5:
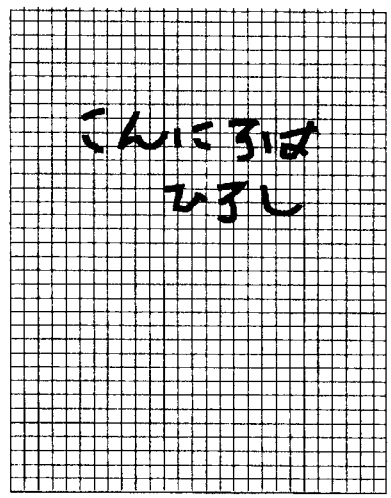
FIG. 5 is a diagram showing the input manuscript of the first embodiment hereof which is divided in a grid form.

The input image dividing means 4 divides the image decoded at STEP A2 into a grid form as shown in FIG. 5. If a grid portion is in a size of 32(horizontal)×30(vertical) dots, the 864×1080 dot image is divided into a 27 (horizontal)×36 (vertical) grid array.

(Steps A4 to A7)

Figure 6:
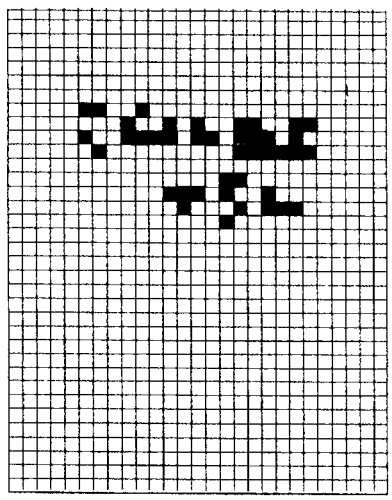
FIG. 6 is a diagram showing flagged regions of the matrix of the first embodiment hereof.

The in-grid pixel counting means 5 counts a number of pixels included in one grid portion and representing a different color from the background. In this example, a number of black pixels is counted because the background color is white. Then, if the number of black pixels in a grid portion exceeds a predetermined threshold value, the grid portion is flagged. This operation is performed on all of the grid portions. FIG. 6 shows the flagged grid portions in the form of solid black squares.

(Step A8)

The rectangular region generating means 6 defines a minimum size of rectangular region that includes all the grid portions flagged through the operations of STEPs A4 to A7, as an image of a descriptive region 50 of the input manuscript image. The operation of STEP A5 prevents the defined descriptive region image 50 from including black pixels resulting from fine noises. It is to be noted that such a rectangular region is not limited to one but may exist in plural numbers.

Figure 7:
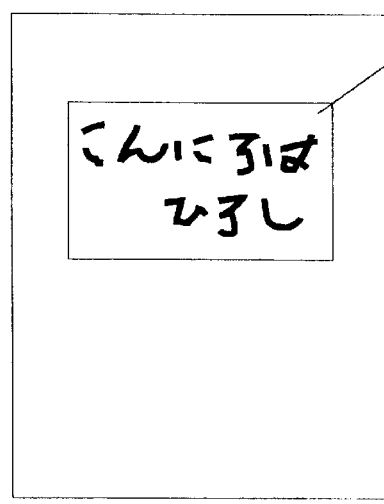
FIG. 7 is a diagram showing an image of a descriptive region according to the first embodiment hereof.

FIG. 7 shows the image of the descriptive region thus defined.

(Step A9)

Figure 8:
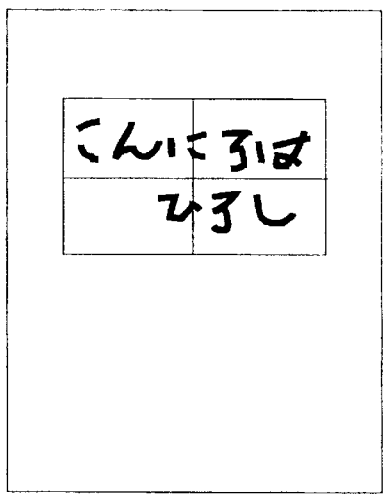
FIG. 8 is a diagram showing segmental descriptive region images according to the first embodiment hereof.

The descriptive region segmenting means 8 segments the descriptive region image detected by the descriptive region detecting means 3 into four segments, as shown in FIG. 8.

(Step A10)

In this step, there is counted a number of pixels included in each of the segmental descriptive region images defined at STEP A9 and representing a different color from the background. That is, a number of black pixels is counted here. Subsequently, the pixel count for each segmental descriptive region image is normalized based on a total number of pixels of the segmental descriptive region image.

If, for example, a descriptive region image detected at STEP A8 has a size of 300(horizontal)×300(vertical) dots, the descriptive region image is divided into four segmental descriptive regions at STEP A9, one of which segmental descriptive regions has a size of 150(horizontal)×150 (vertical) dots. If, in this case, a certain segmental descriptive region image presents a black pixel count of 10000, the pixel count is normalized by the total number of pixels of the segmental descriptive region image (150×150=22500). Thus, the normalized black pixel count of this segmental descriptive region image is 10000/22500=0.44.

Each of the segmental regions is subject to this operation thereby to give a luminance distribution of the descriptive region image. Additionally, a mean pixel luminance is found from a ratio of the black pixel count versus the white pixel count.

(Step A11)

The layout pattern selecting means 12 selects a layout pattern by referring, to the table stored in the table storage means 11, the horizontal and vertical lengths of the manuscript descriptive region image detected at STEP A8 and the normalized black pixel count and the mean luminance obtained at STEP A11. First, the horizontal and vertical lengths, black pixel count and luminance, which are continuous values, are classified into three categories of great", medium" and small" based on value range. By way of example of the horizontal length of the descriptive region image, a horizontal length of 600 or more dots is regarded as great", that of less than 600 dots and not less than 300 dots is regarded as medium and that of less than 300 dots is regarded as small". Further by way of example of the black pixel count, a count of not less than 0.7 is regarded as great", that of less than 0.7 and not less than 0.4 is regarded as medium", and that of less than 0.4 is regarded as small".

Subsequently, the parameters thus defined are referred to the table (Table 1) for selection of the layout pattern.

TABLE 1

| HORIZONTAL LENGTH OF DESCRIPTIVE REGION | VERTICAL LENGTH OF DESCRIPTIVE REGION | IMAGE CHARACTERISTIC VALUE ||||| LAYOUT PATTERN |
|---|---|---|---|---|---|---|---|
| | | BLACK PIXEL COUNT FOR SEGMENTAL DESCRIPTIVE REGION 1 | BLACK PIXEL COUNT FOR SEGMENTAL DESCRIPTIVE REGION 2 | BLACK PIXEL COUNT FOR SEGMENTAL DESCRIPTIVE REGION 3 | BLACK PIXEL COUNT FOR SEGMENTAL DESCRIPTIVE REGION 4 | MEAN LUMINANCE OF DESCRIPTIVE REGION | |
| GREAT | GREAT | GREAT | GREAT | GREAT | GREAT | GREAT | 2 |
| GREAT | GREAT | GREAT | GREAT | GREAT | GREAT | MEDIUM | 5 |
| ... | ... | ... | ... | ... | ... | ... | ... |
| GREAT | MEDIUM | MEDIUM | SMALL | SMALL | SMALL | MEDIUM | 7 |
| ... | ... | ... | ... | ... | ... | ... | ... |

In a case where, for example, a descriptive region image 50 has the great horizontal length and the medium vertical length, the segmental descriptive region images have pixel counts of medium, small, small and small, respectively, and the mean luminance is medium, a seventh layout pattern is selected from Table 1. A relation of the parameters of the descriptive region image, such as great, medium and small, versus the layout pattern to be selected is previously determined by statistical processing of questionnaire answers from designers. The statistical processing is directed to the overall balance of the document layout and the reduced transmission amount.

Figure 9:
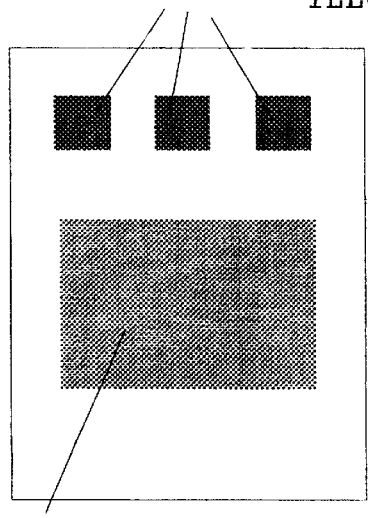
FIG. 9 is a diagram showing a layout pattern according to the first embodiment hereof.

The layout pattern is stored in the layout pattern storage means 10 in the form of description on a number of illustrations and positions of illustrations and the descriptive region image, as shown in FIG. 9.

FIG. 9*a* depicts an imaginary layout pattern thus specified. In actual practice, however, the same content as that of FIG. 9*a* is expressed by a list of numbers of illustrations and coordinate information pieces, as shown in FIG. 9*b*.

(Step A12)

The illustration selecting means 14 selects from the illustrations stored in the illustration storage means 13 an illustration to be inserted in a superimposition area of the layout pattern selected at STEP A11. The illustration is selected based on, for example, random numbers.

(Step A13)

The illustration selected at STEP A12 and the image 50 of the manuscript descriptive region are superimposed on the layout pattern selected at STEP A11.

The descriptive region image is superimposed on the layout pattern of FIG. 9 at the position of the descriptive region. It is to be noted here that the layout pattern selected from the table at STEP A11 includes the descriptive region superimposition area, which has a size equal to or greater than the read descriptive region image. Accordingly, the descriptive region image is laid at the center of the descriptive region superimposition area when the descriptive region image is combined with the layout pattern. In order to permit this, there may be prepared such a layout pattern as to accommodate a rectangular region of a maximum size.

(Step A14)

The text image of the descriptive region of the input manuscript is superimposed on the layout pattern to produce a composite image, which is encoded into a form for output.

(Step A15)

The encoded image is applied to the image output means 17 so as to be printed by the printer 106.

Figure 10:
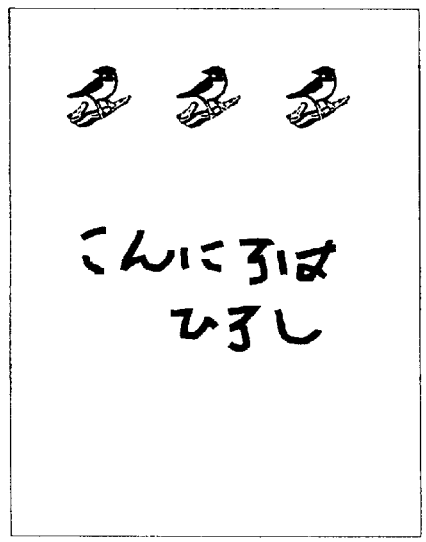
FIG. 10 is a diagram showing a document produced according to the first embodiment hereof.

FIG. 10 shows an exemplary output of a document thus produced.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to a state of the descriptive region image, thereby accomplishing the layout in which the images of the illustration and descriptive region are laid in balance.

Although the first embodiment of the invention has been described by way of example of the black/white binary image of A4 size, it should be understood that the invention is not limited in the manuscript size, the number of colors and the like and may be embodied in an optional size and number of colors.

Figure 11:
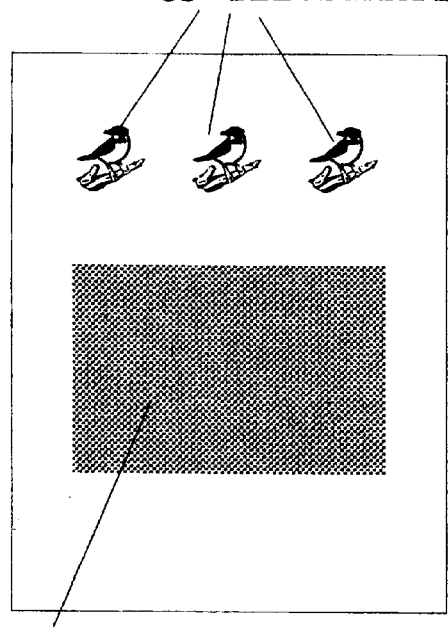
FIG. 11 is a diagram showing a layout pattern with illustrations previously added thereto according to the first embodiment hereof.

In addition to the predetermined position to lay the illustration, the layout pattern may include a predetermined illustration. In this case, the layout pattern includes both the content(e.g., sparrow) and the position of the specific illustration, as shown in FIG. 11. Incidentally, the illustration selecting means 14 may be omitted.

Although the first embodiment hereof uses the horizontal and vertical lengths, black pixel count and mean luminance of the descriptive region image of the manuscript for deciding the document layout, it is to be understood that the invention should not be limited to the above. A similar effect may be attained by using any other image characteristic values obtained from the descriptive region image.

According to the first embodiment hereof, there is one type of document produced. An alternative arrangement may be made such that plural types of optional documents are displayed on a monitor screen (not shown) for allowing the user to select one from these.

Figure 12:
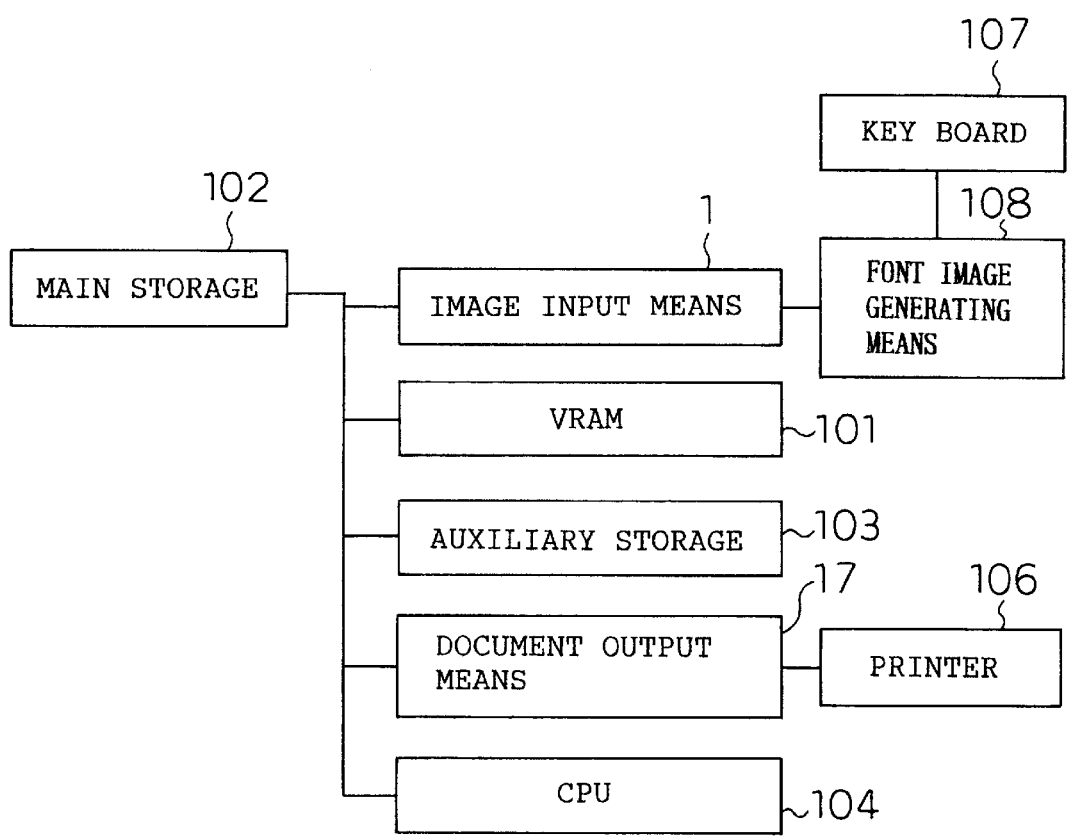
FIG. 12 is a block diagram showing another exemplary hardware construction of the system according to the first embodiment hereof.

According to the first embodiment hereof, the manuscript image is read by the scanner 105. Alternatively, a key board 107 and a font image generating means 108 may be provided, as shown in FIG. 12, such that a text entered by the user through the key board 107 is converted into an image by the font image generating means 108 and the converted image is inputted in the image input means 1. This arrangement also permits the production of the document wherein the illustration is automatically added to the text entered by the user.

Figure 13:
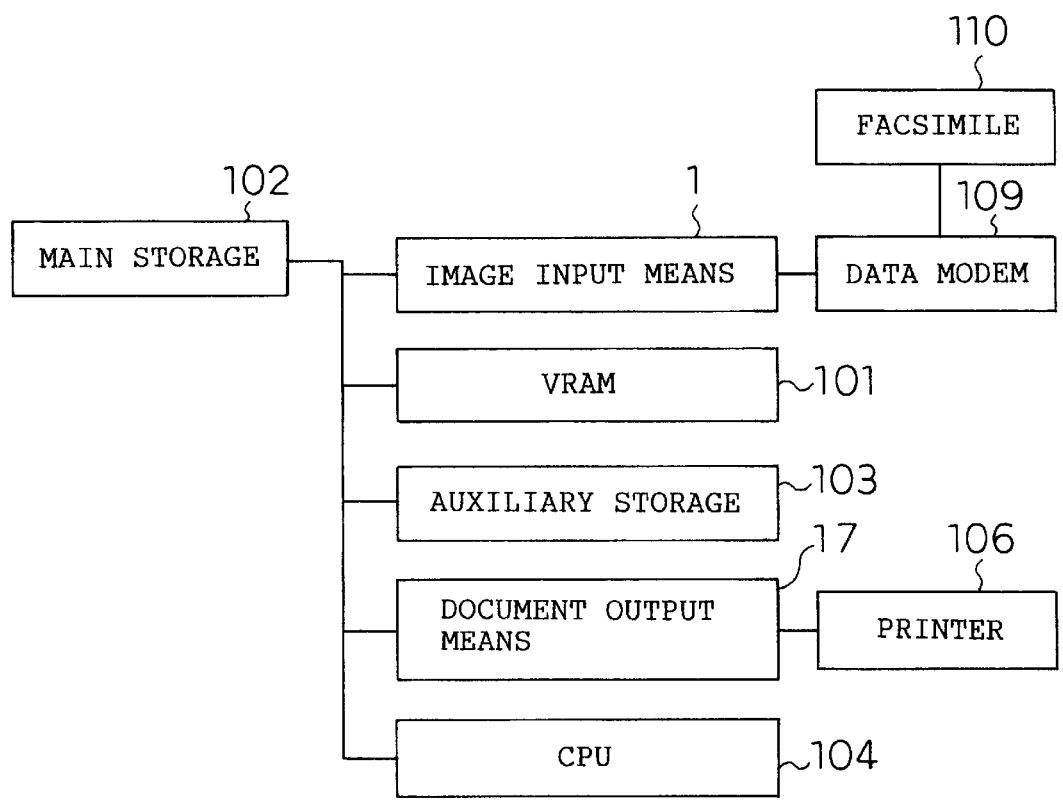
FIG. 13 is a block diagram showing yet another exemplary hardware construction of the system according to the first embodiment hereof.

According to the first embodiment hereof, the manuscript image is read by the scanner 105. Alternatively, a data modem 109 may be connected to a facsimile 110 via a telephone line, as shown in FIG. 13, for inputting the manuscript image through the facsimile 110. This arrangement also permits the production of the document with the illustration automatically added thereto.

Figure 14:
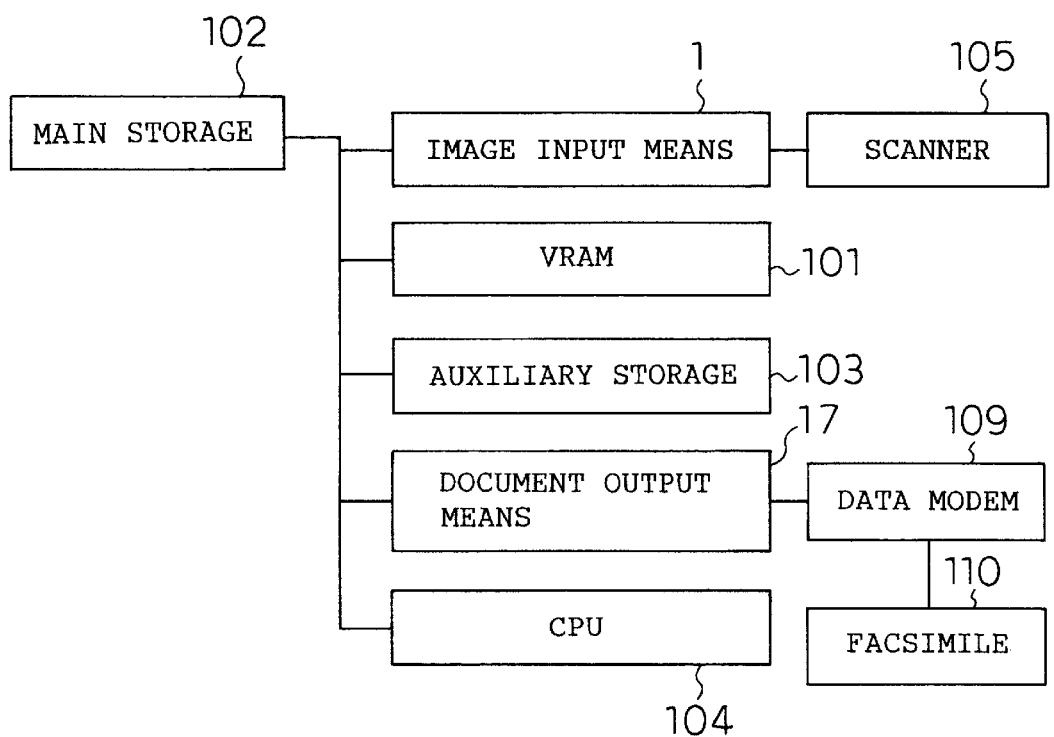
FIG. 14 is a block diagram showing still another exemplary hardware construction of the system according to the first embodiment hereof.

According to the first embodiment hereof, the printer 106 is employed for printing the produced document image. Alternatively, the data modem 109 is connected to the facsimile 110 via the telephone line, as shown in FIG. 14, such that the outputted document is transmitted to the facsimile 110 via the data modem 109. This arrangement also permits the printing of the document with the illustration added thereto.

According to the first embodiment hereof, the illustration selecting means 14 serves to select a specific illustration based on random number. Alternatively, the user himself may select a specific illustration and superimpose the selected illustration on an illustration insertion area. In this case, optional illustrations are displayed by means of illustration display means (not shown) for allowing the user to select a desired illustration through input means such as the key board.

Second Embodiment

Figure 15:
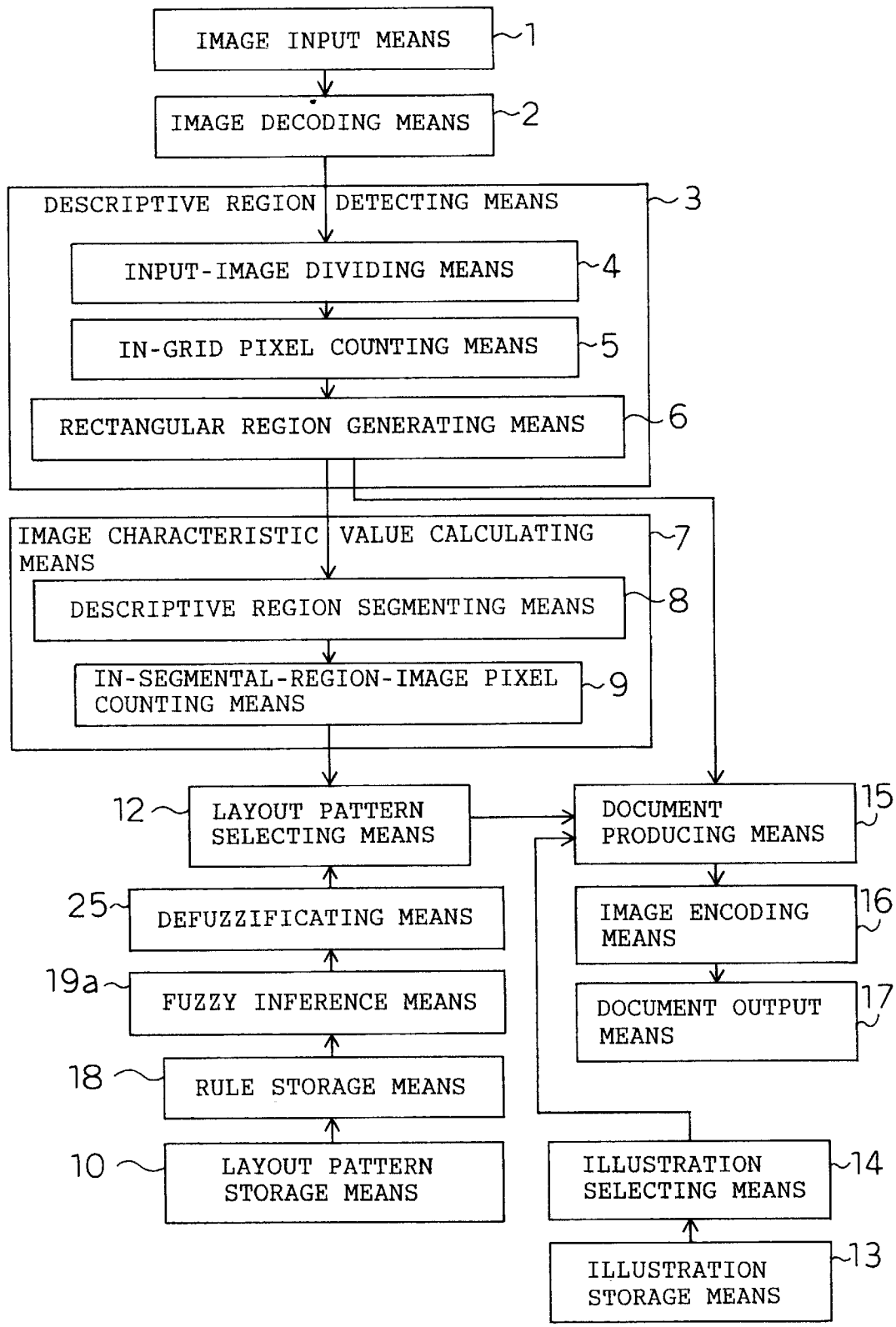
FIG. 15 is a block diagram showing an exemplary system arrangement according to a second embodiment hereof.

FIG. 15 is a block diagram showing an arrangement of an image production method and system according to a second embodiment of the invention.

The arrangement of FIG. 15 includes identical components to those of the system arrangement according to the first embodiment hereof. Therefore, such components are represented by like reference numerals and the detailed description thereof is omitted.

The system of the second embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region segmenting means 8, the in-segmental-descriptive-region-image pixel counting means 9, the layout pattern storage means 10, rule storage means 18 for storing fuzzy rules used for the layout decision, fuzzy inference means 19a for performing inference based on the fuzzy rules stored in the rule storage means thereby deciding the layout pattern, defuzzificating means 25 for finding a real value from a fuzzy inference result, the layout pattern selecting means 12, the illustration storage means 13, the illustration selecting means 14, the document producing means 15, the image encoding means 16 and the document output means 17.

A hardware construction for carrying out the system of the above arrangement is essentially the same with the general-purpose computer system and is shown in FIG. 2. Since this arrangement is the same as the construction of the first embodiment hereof, the description thereof is omitted.

The image production method and operations of the image production system of the above arrangement will be described with reference to the flow chart shown in FIG. 16.
(Steps B1 to B10)

Figure 3:
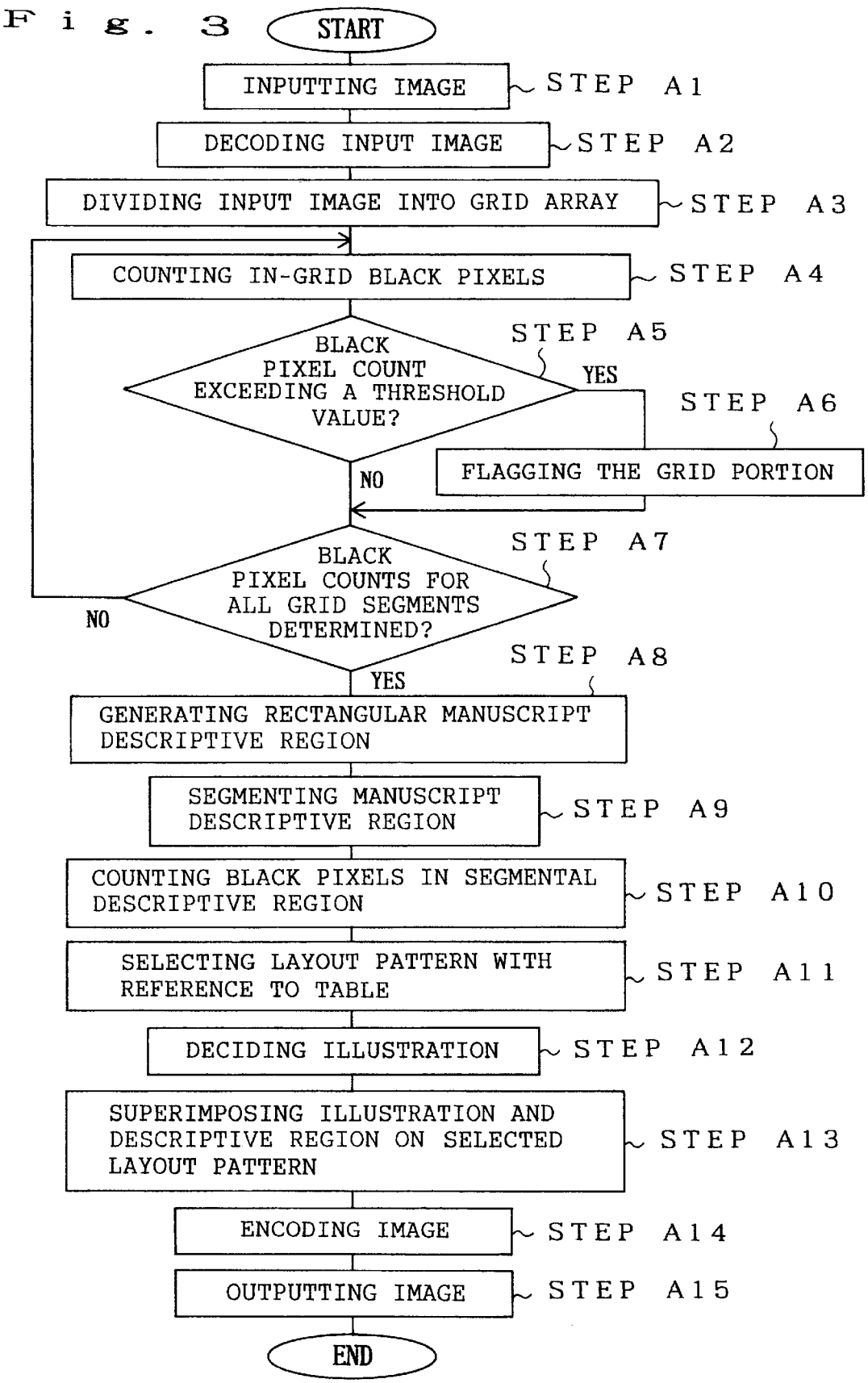
FIG. 3 is a flow chart representing steps of an image producing procedure according to the first embodiment hereof.

Operations at these steps are the same as those performed at STEPs A1 to A10 shown in FIG. 3 and therefore, the description thereof is omitted.
(Steps B11 to B13)

A layout pattern is selected by applying a horizontal and a vertical length of a manuscript descriptive region image detected at STEP A8 and a normalized black pixel count and a mean luminance determined at STEP B10 to the rules.

The rules for layout pattern selection are stated according to the fuzzy rules, as shown in FIG. 17.

For example, as to the case of a descriptive region image 50 with the great" horizontal length, each layout pattern is described according to the fuzzy rules, indicating a degree of favorableness of the layout pattern. Likewise, as to the cases of descriptive region images with the medium" and small" horizontal lengths, the description is made on each layout pattern, indicating a degree of favorableness thereof.

As to the other attributes or the vertical length, black pixel count, mean luminance of the descriptive region image 50, a relation between each of the attribute values and each layout pattern is stated according to the fuzzy rules. Such fuzzy rules are stored in the rule storage means 18.

Now, the description will hereinbelow be made on how the layout pattern is selected by using the fuzzy rules. For simplicity, the description will be made by way of example of an inference operation using the horizontal length of the descriptive region image alone.

First at STEP B11, in the case of a descriptive region image 50 with the horizontal length of 500 dots, the fuzzy inference means 19a ignites rules for the great" and medium" descriptive region images 50 for truncating a membership function of the favorableness of each layout pattern, as the consequent part, based on a membership function of the antecedent part.

Figure 18A:
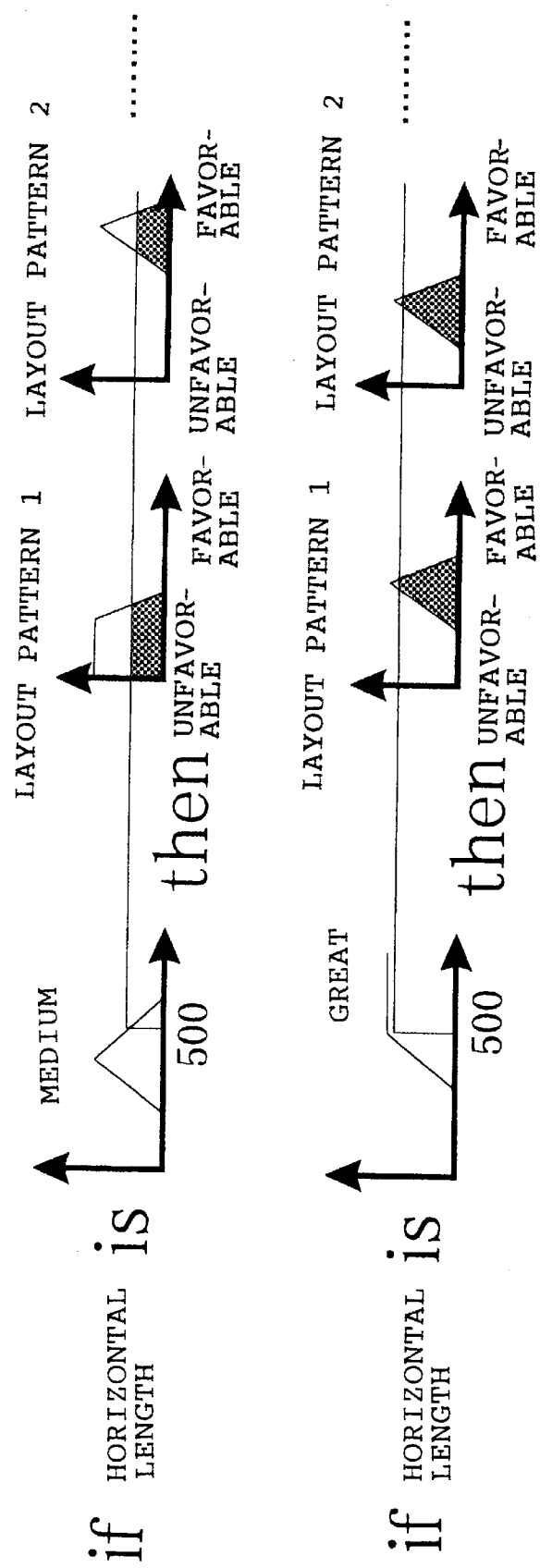
FIG. 18 is a diagram illustrating a fuzzy inference scheme according to the second embodiment hereof.

FIG. 18a illustrates the process of this operation.

As to the great" and medium descriptive regions thus truncated, the membership functions of the consequent parts are OR-synthesized to give an inference result.

Figure 18B:
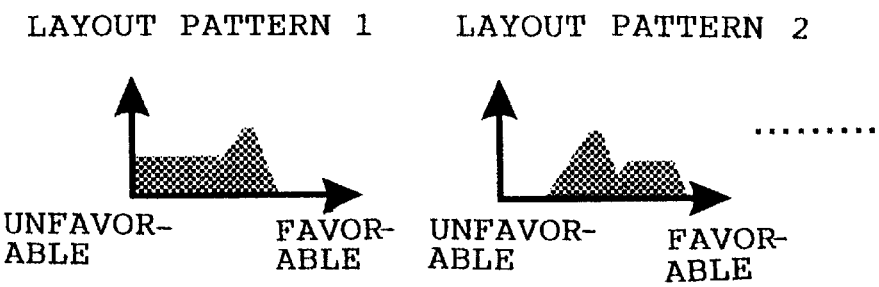

FIG. 18b shows the inference result indicating a degree of favorableness of each layout pattern.

At the subsequent STEP B12, the defuzzificating means 25 defuzzificates the inference results by determining respective centroids thereof.

Figure 18C:
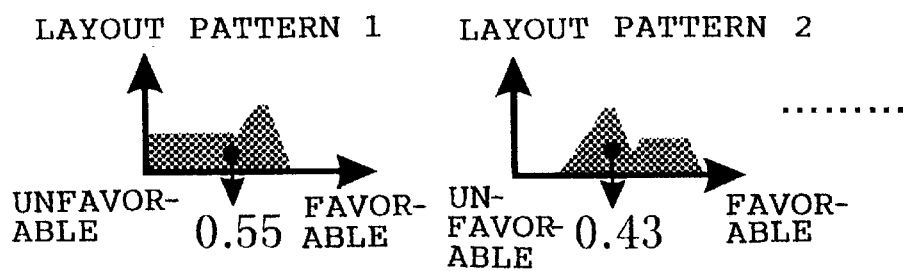

FIG. 18c illustrates a process of obtaining real values through the defuzzification procedure. The procedure gives the degree of favorableness of each layout pattern in terms of real value.

At the subsequent STEP B13, the layout pattern selecting means 12 selects one from the layout patterns that has the greatest real value of favorableness determined at STEP B12.

The fuzzy inference actually includes similar fuzzy rules for the other attribute values in addition to that for the horizontal length of the descriptive region image. Therefore, inference results based on the other rules are OR-synthesized to give a synthetic fuzzy inference result. The fuzzy rules used herein are formulated based on statistical data obtained from a questionnaire to designers and the like.
(Steps B14 to B17)

Operations at these steps are the same as those performed at STEPs A12 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to the state of the descriptive region image, thereby accomplishing the layout in which the images of the illustration and descriptive region are laid in balance.

Although this embodiment hereof has been described by way of example of the black/white binary image of A4 size, it should be understood that the invention is not limited in the manuscript size, the number of colors and the like and may be embodied in an optional size and number of colors.

In addition to the predetermined position to superimpose the illustration, the layout pattern may include a predetermined illustration.

In the fuzzy inference operation according to the second embodiment hereof, the consequent parts are OR-synthesized but may be synthesized by any other method. Further, the inference results are defuzzificated by determining the centroids thereof but may be defuzzificated by any other method.

Figure 19:
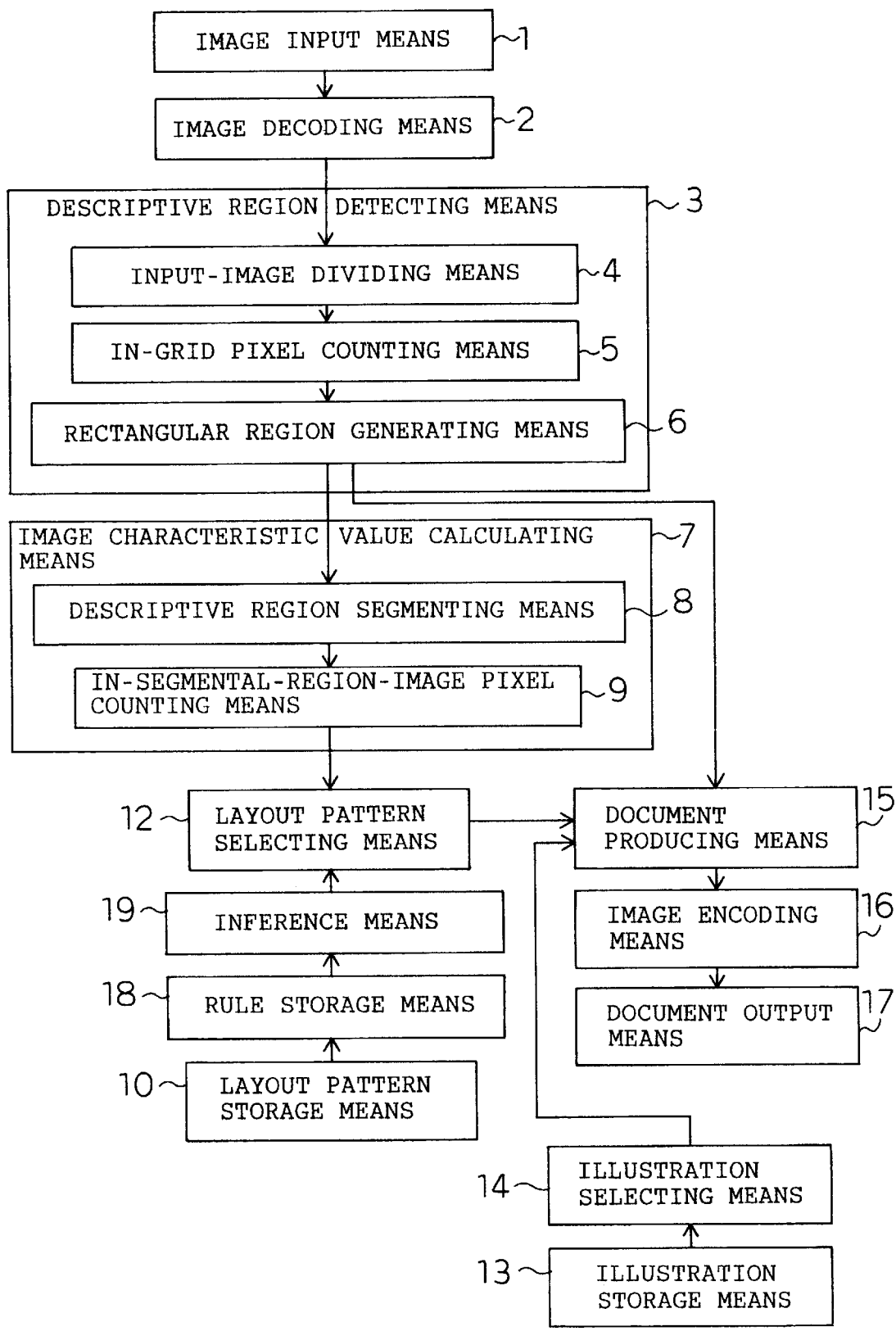
FIG. 19 is a block diagram showing another exemplary system arrangement according to the second embodiment hereof.

Although this embodiment hereof uses the fuzzy inference operation for deciding the layout pattern, an inference operation based on the typical if-then rules rather than on the fuzzy logic, or any other inference operation may be used. In this case, the rule storage means 18 shown in FIG. 15 contains general statements of the production rules, neural net, clustering procedure and the like, instead of the fuzzy rules. Further, the fuzzy inference means 19a and the defuzzificating means 25 are replaced by inference means 19. Hence, a system in this case is arranged the same way as shown in FIG. 19.

Third Embodiment

Figure 20:
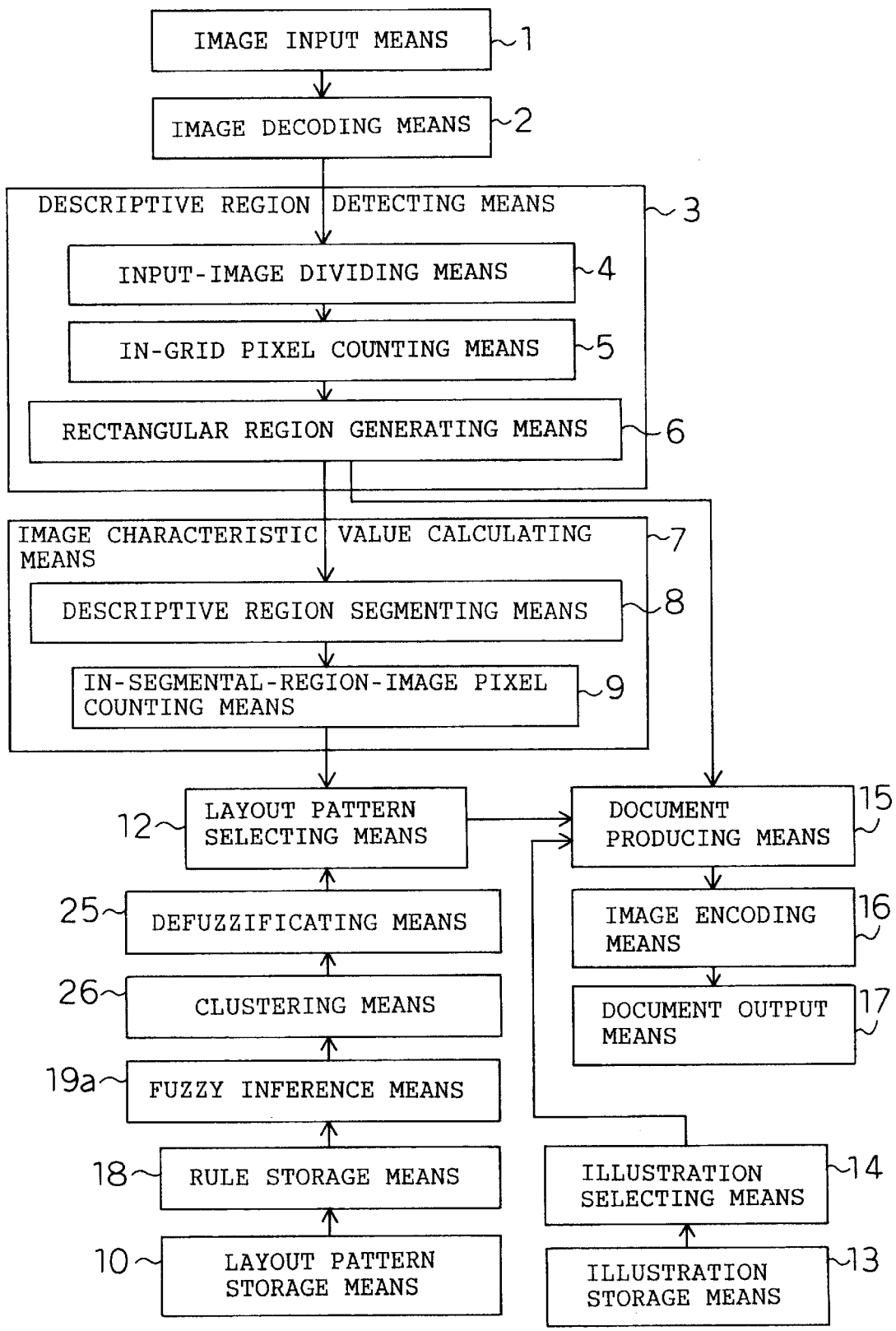
FIG. 20 is a block diagram showing a system arrangement according to a third embodiment hereof.

FIG. 20 is a block diagram showing an arrangement of an image production method and system according to a third embodiment of the invention.

The arrangement of FIG. 20 includes identical components to those of the system arrangement according to the second embodiment hereof. Therefore, such components are represented by like reference numerals and the detailed description thereof is omitted.

The system of the third embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region segmenting means 8, the in-segmental-descriptive-region-image pixel counting means 9, the layout pattern storage means 10, the rule storage means 18, the fuzzy inference means 19a, the defuzzificating means 25, clustering means 26 for clustering the fuzzy inference results, the layout pattern selecting means 12, the illustration storage means 13, the illustration selecting means 14, the document producing means 15, the image encoding means 16 and the document output means 17.

A hardware construction for carrying out the system of the above arrangement is essentially the same as the general-purpose computer system and is shown in FIG. 2. Since this arrangement is the same with the construction of the first embodiment hereof, the description thereof is omitted.

The image production method and operations of the system of the above arrangement will be described with reference to the flow chart shown in FIG. 21.
(Steps C1 to C10)
Operations at these steps are the same as those performed at STEPs A1 to A10 shown in FIG. 3 and therefore, the description thereof is omitted.
(Steps C11 to C14)
A layout pattern is selected by applying a horizontal and a vertical length of the manuscript descriptive region image detected at STEP C8 and a normalized black pixel count and a mean luminance determined at STEP C10 to the rules.

As shown in FIG. 17, the rules for layout pattern selection are stated according to the fuzzy rules similarly to the second embodiment hereof.

Now, how the fuzzy rules are used to select the layout pattern will be described. For simplicity, the description will be may by way of example of an inference operation using the horizontal length of the descriptive region image alone.

At STEP C11, the fuzzy inference is performed on the horizontal length of the descriptive region image 50. This inference operation takes the same procedure as in STEP B11 according to the second embodiment hereof.

Figure 22A:
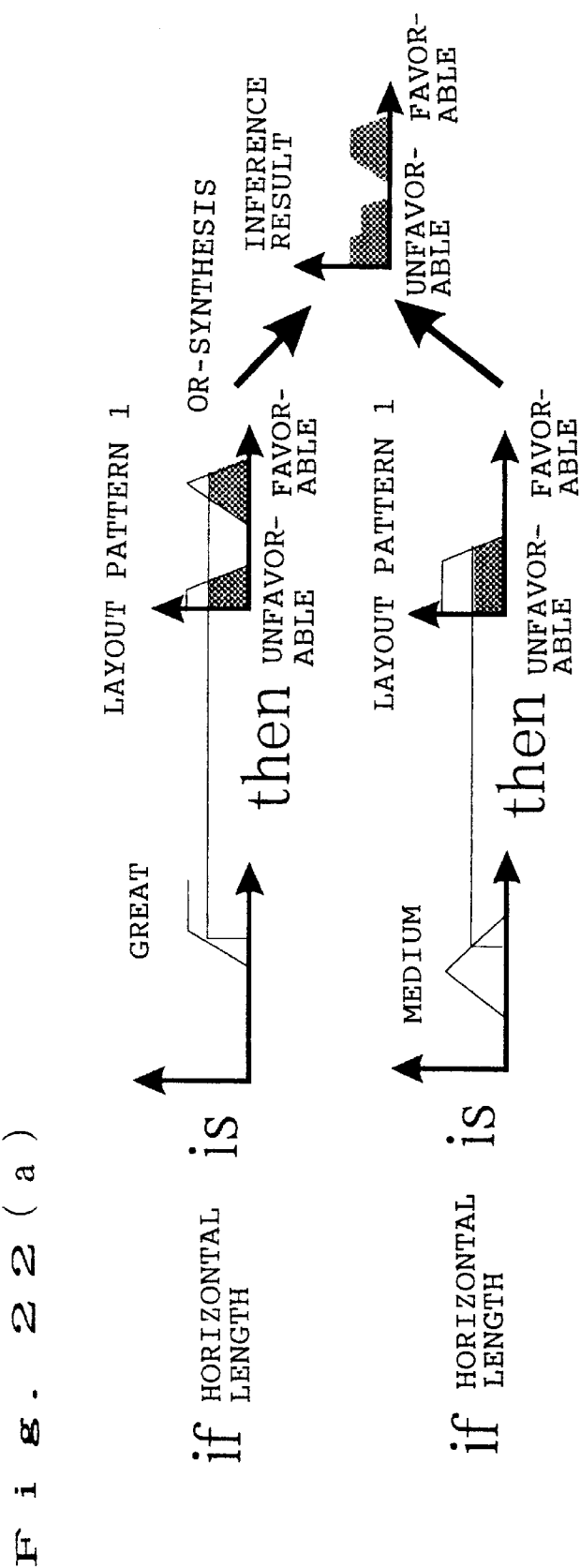
FIG. 22 is a diagram illustrating fuzzy rules according to the third embodiment hereof.

FIG. 22a show the process of this inference operation.

Figure 22B:
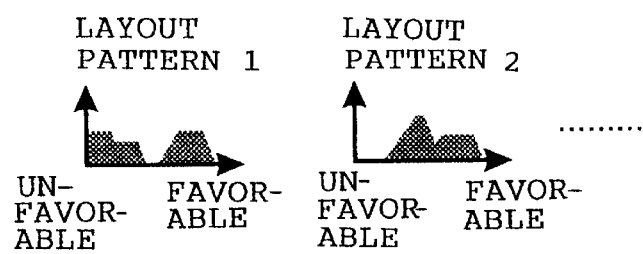

FIG. 22b shows favorablenesses of the respective layout patterns thus obtained as the inference results.

Referring to FIG. 22b, the inference result includes two regions indicative of the favorableness of the layout pattern 1. This is ascribable to the consequent part of a rule shown in FIG. 22a which includes two membership function peaks indicating the favorableness of the great" horizontal length.

The fuzzy rule with such a characteristic may be obtained when the fuzzy rules are formulated based on the questionnaire. More specifically, such a rule may be formulated when some answers are favorable" while the others are unfavorable" as to the great" horizontal length of the layout pattern 1.

On the other hand, the inference result of the layout pattern 2 presents such a shape as observed in the typical fuzzy inference operation, or presenting only one region.

Here, the inference result of FIG. 22b is defuzzificated simply by finding a centroid of the region. Hence, the favorableness of the layout pattern 2 is defuzzificated.in the proximity of 0.5.

Actually, however, the favorableness is sharply divided about the layout pattern 1. Thus, an appropriate inference result seems to be obtained by discretely defuzzificating the two regions for finding two values thereof, rather than defuzzificating both the regions together for obtaining an intermediate value of 0.5, the two regions representing a positive subjectiveness and a negative subjectiveness, respectively.

Hence, the inference results are subject to a clustering procedure at STEP C12, thereby to determine how many output values are obtained. Any method may be used for the clustering procedure. This embodiment takes the clustering procedure based on the well-known fuzzy C-means method (Literature 1: Bezdek: "Pattern Recognition with Fuzzy Objective Function Algorithm", Plenum Press, 1982), incorporated herein by reference.

The clustering procedure based on the Fuzzy C-Means Method is initiated at a number of cluster unit of 1 for finding Bezdek's evaluation value Jc(C=1) with respect to cluster unit number 1. Subsequently, the operation proceeds with the number of cluster unit increased by 1 at a time. At each increase in the number of cluster unit, the evaluation value Jc is found based on equation 1.

$$J_c - J_{c-1} > \delta_j \qquad \text{EQUATION 1}$$

When these evaluation values satisfy equation 1 with respect to a certain threshold value δj, the clustering procedure is completed to give an evaluation value C, which indicates the number of inference values to be outputted.

According to this clustering procedure, the inference result of the layout pattern 1 presents two cluster units while the inference result of the layout pattern 2 presents one cluster unit, as shown in FIG. 22b.

At the subsequent STEP C13, the defuzzificating means 25 defuzzificates the result by determining the centroid thereof.

Figure 22C:
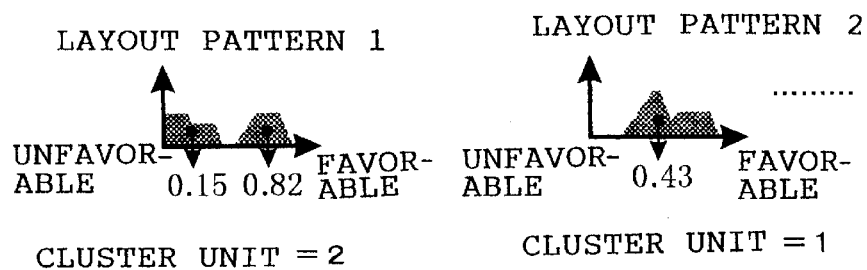

FIG. 22c illustrates a process of obtaining the real values through the defuzzification procedure. The aforementioned procedure provides the degree of favorableness of each layout pattern in terms of real value. That is, there are obtained two real values with respect to the layout pattern 1 and one real value with respect to the layout pattern 2.

At the subsequent STEP C14, the layout pattern selecting means 12 selects one from the layout patterns that has the greatest real value of favorableness determined at STEP C13. It is to be noted that a rule for a layout pattern presenting not less than two real values is previously set such that, for example, the selection is always determined based on the greatest value. An alternative rule may be made such that a layout pattern with the lowest value is not selected.

In actual practice, the fuzzy inference also observes similar rules for the other attribute values besides the horizontal length of the descriptive region image. Accordingly, the synthetic fuzzy inference result is obtained by OR-synthesizing the inference results based on the other rules. The fuzzy rules used herein are formulated based on the questionnaire to the designers and the like.

(Steps C15 to C18)

Operations at these steps are the same as those performed at STEPs A12 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to the state of the descriptive region image, thereby accomplishing the layout in which the images of the illustration and descriptive region are laid in balance.

Fourth Embodiment

Figure 23:
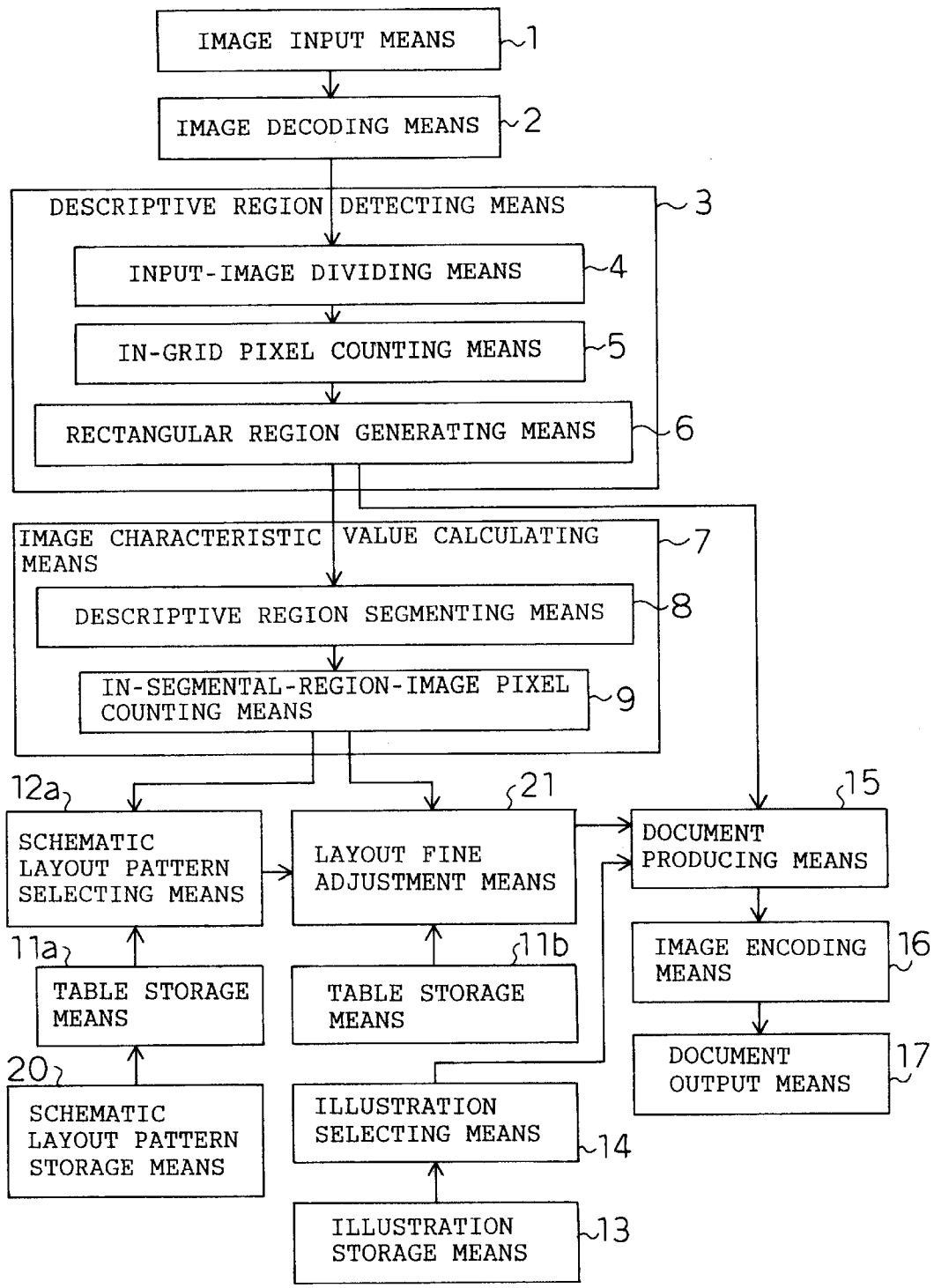
FIG. 23 is a block diagram showing a system arrangement according to a fourth embodiment hereof.

FIG. 23 is a block diagram showing an arrangement of an image production method and system according to a fourth embodiment of the invention.

The arrangement of FIG. 23 includes identical components to those of the system arrangement according to the first embodiment hereof. Therefore, such components are represented by like reference numerals and the detailed description thereof is omitted.

The system of the fourth embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region segmenting means 8, the in-segmental-descriptive-region-image pixel counting means 9, schematic layout pattern storage means 20 for storing a schematic layout pattern of manuscript which pattern is composed of at least one of information items about a number of illustrations, approximate positions of illustrations and an approximate position of a manuscript descriptive region, table storage means 11a for storing a table used for deciding the schematic layout, schematic layout pattern selecting means 12a, table storage means 11b for storing a table used for fine adjustment of the layout decided, layout fine adjustment means 21 for deciding a precise position of the selected schematic layout based on the image characteristic value determined by the image characteristic value calculating means, the illustration storage means 13, the illustration selecting means 14, the document producing means 15, the image encoding means 16 and the document output means 17.

A hardware construction for carrying out the system of the above arrangement is essentially the same as the general-purpose computer system and is shown in FIG. 2. Since this arrangement is the same as the construction of the first embodiment hereof, the description thereof is omitted.

Figure 24:
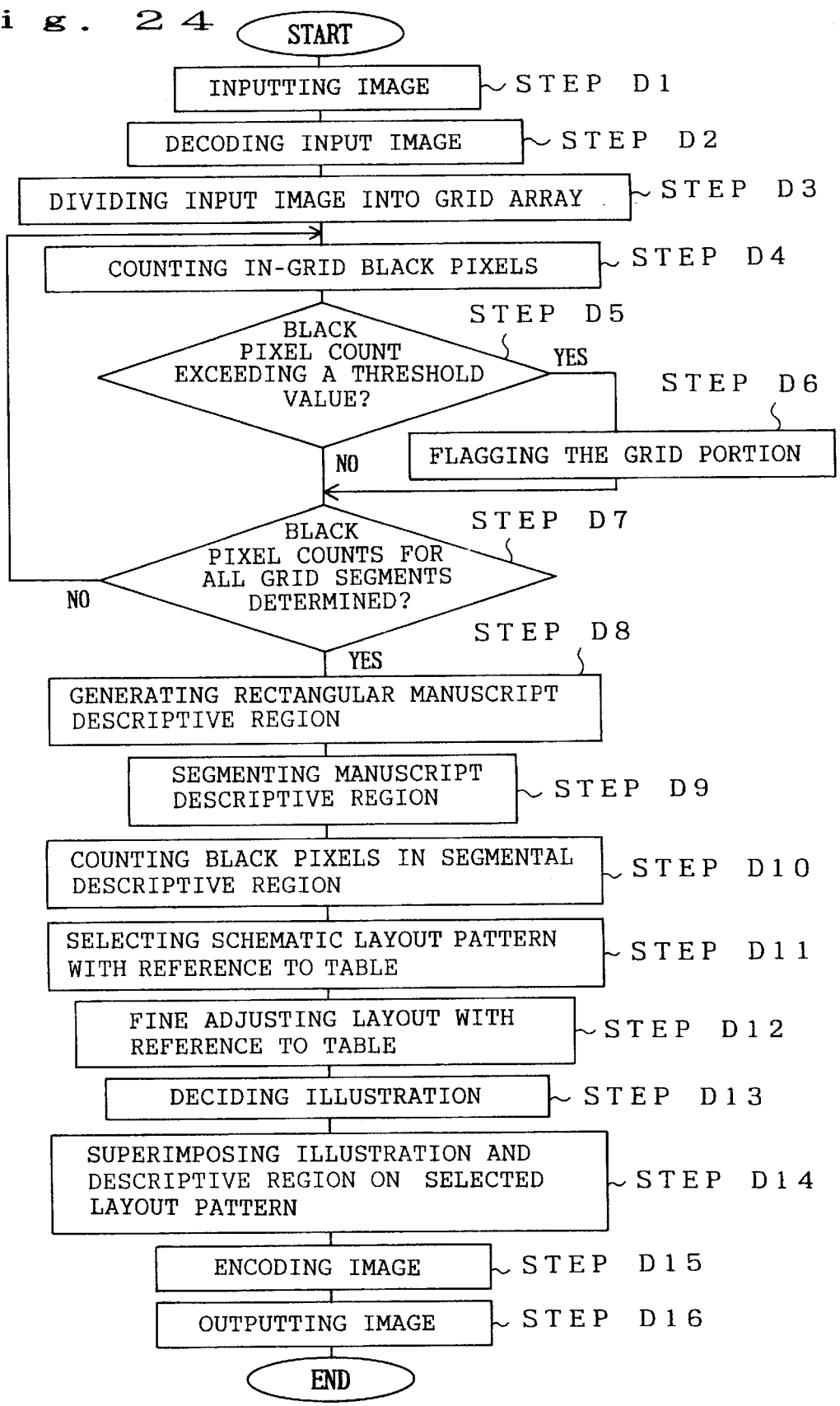
FIG. 24 is a flow chart representing steps of an image producing procedure according to the fourth embodiment hereof.

The image production method and operations of the image production system of the above arrangement are described with reference to the flow chart shown in FIG. 24.

(Steps D1 to D10)

Operations at these steps are the same as those performed at STEPs A12 to A15 shown in FIG. 3 and therefore, the description thereof is omitted.

(Step D11)

A schematic layout pattern is selected by applying a horizontal and a vertical length of the manuscript descriptive region image detected at STEP D8 and a normalized black pixel count and a mean luminance determined at STEP D10 to the rules. First, the horizontal and vertical lengths, black pixel count and mean luminance, which are continuous values, are classified into three categories of great", medium" and small" based on value range. The classification method is the same as the aforementioned operation at STEP A11 of the first embodiment hereof.

Subsequent to this classification operation, reference is made to the table (Table 2) for selection of a schematic layout pattern.

TABLE 2

| | | IMAGE CHARACTERISTIC VALUE | | | | | |
|---|---|---|---|---|---|---|---|
| HORIZONTAL LENGTH OF DESCRIPTIVE REGION | VERTICAL LENGTH OF DESCRIPTIVE REGION | BLACK PIXEL COUNT FOR SEGMENTAL DESCRIPTIVE REGION 1 | BLACK PIXEL COUNT FOR SEGMENTAL DESCRIPTIVE REGION 2 | BLACK PIXEL COUNT FOR SEGMENTAL DESCRIPTIVE REGION 3 | BLACK PIXEL COUNT FOR SEGMENTAL DESCRIPTIVE REGION 4 | MEAN LUMINANCE OF DESCRIPTIVE REGION | SCHEMATIC LAYOUT PATTERN |
| GREAT | GREAT | GREAT | GREAT | GREAT | GREAT | GREAT | 1 |
| GREAT | GREAT | GREAT | GREAT | GREAT | GREAT | MEDIUM | 9 |
| . . . | . . . | . . . | . . . | . . . | . . . | . . . | . . . |
| SMALL | GREAT | MEDIUM | SMALL | SMALL | SMALL | MEDIUM | 4 |
| . . . | . . . | . . . | . . . | . . . | . . . | . . . | . . . |

In a case where a descriptive region image has the small horizontal length and the great vertical length, segmental descriptive regions have pixel counts of medium, small, small and small in this order, and the mean luminance is medium, for example, a schematic layout pattern 4 is selected from Table 2.

The schematic layout pattern storage means 20 stores the schematic layout pattern in which the number of illustrations, the approximate positions of the illustrations and the position of descriptive region image are described, as shown in FIG. 25a.

In actual practice, allowable ranges of the number of illustrations and the illustration positions are described, as shown in FIG. 25b.

(Step D12)

The layout fine adjustment means 21 performs fine adjustment of a layout based on the schematic layout pattern selected at STEP D11 and the aforesaid image characteristic values.

The layout fine adjustment is performed by using the table for layout fine adjustment shown in Table 3, which is stored in the table storage means 11b.

TABLE 3

| SCHEMATIC LAYOUT PATTERN | IMAGE CHARACTERISTIC VALUE | | POSITION OF ILLUSTRATION |
|---|---|---|---|
| | HORIZONTAL LENGTH OF DESCRIPTIVE REGION | VERTICAL LENGTH OF DESCRIPTIVE REGION | |
| 4 | GREAT | GREAT | ILLUSTRATION 1 x = 60, y = 100 ILLUSTRATION 2 x = 160, y = 100 |
| 4 | GREAT | MEDIUM | ILLUSTRATION 1 x = 70, y = 110 ILLUSTRATION 2 x = 170, y = 110 |
| . | . | . | . |
| . | . | . | . |
| . | . | . | . |
| 4 | SMALL | GREAT | ILLUSTRATION 1 x = 50, y = 90 ILLUSTRATION 2 x = 150, Y = 90 |

This table gives coordinates of a position of an illustration associated with, for example, a schematic layout pattern 4 in which the descriptive region image has the small" vertical length and the great" horizontal length. This operation provides varied layouts from one selected schematic layout pattern, the layouts varied depending upon a state of the descriptive region image as shown in FIG. 26. Although not shown in Table 3, the descriptive region has an allowance of the position thereof, as shown in FIG. 25b, thus allowing for the fine adjustment.

(Steps D13 to D16)

Operations at these steps are the same as those performed at STEPs A12 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. Furthermore, as compared to a document of a similar layout which is not subject to the fine adjustment, a document with better appearance may be obtained by having the layout thereof fine adjusted according to the state of the manuscript descriptive region image.

According to the fourth embodiment hereof, the selection of the schematic layout pattern and the fine adjustment of the layout are performed with reference to the tables. Instead of relying on the tables, the decision of the schematic layout pattern and the layout fine adjustment may be accomplished by performing the rule-based inference, the fuzzy inference based on the fuzzy rules or the fuzzy inference for obtaining plural outputs through the clustering procedure.

Fifth Embodiment

Figure 27:
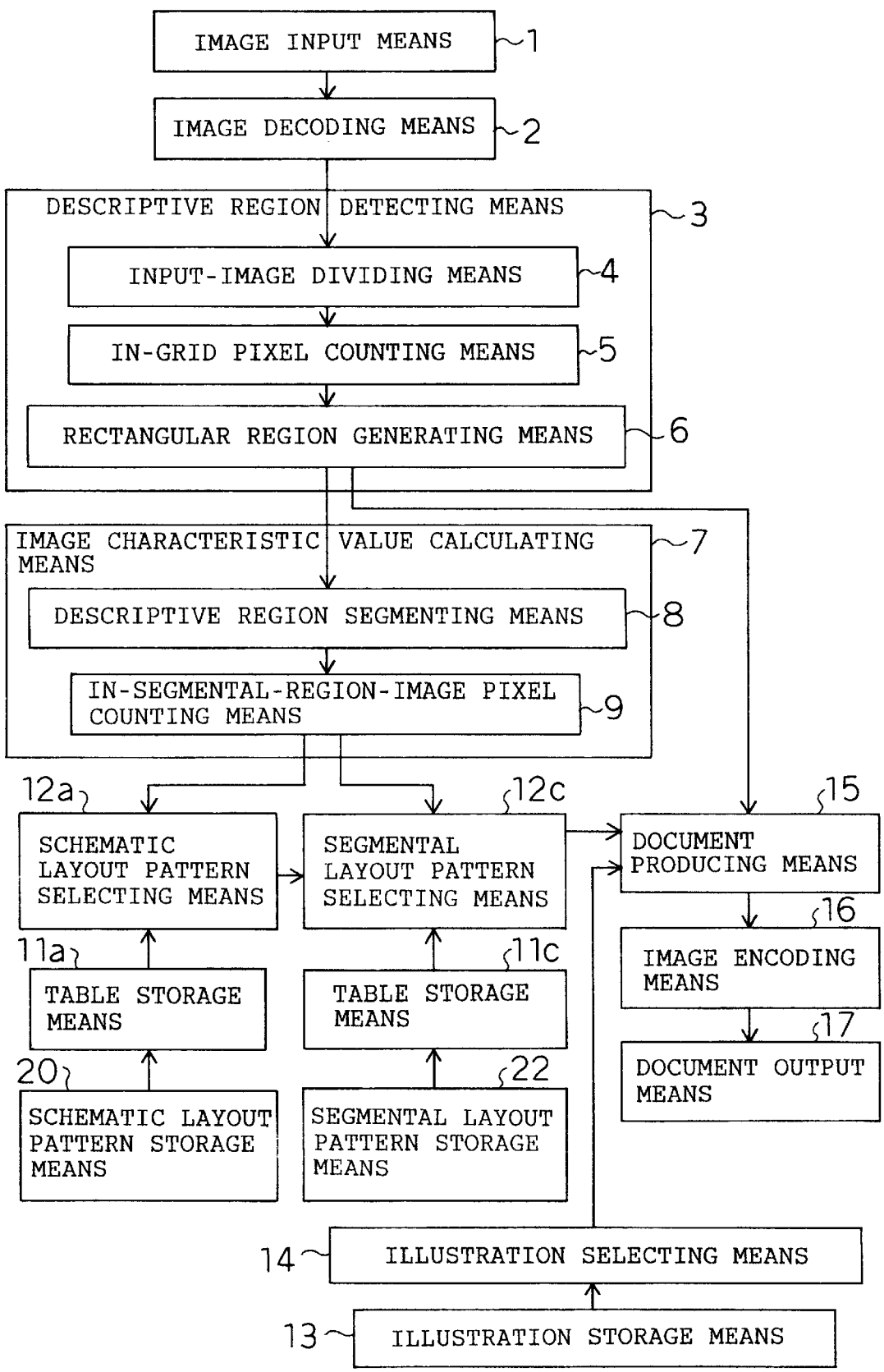
FIG. 27 is a block diagram showing a system arrangement according to a fifth embodiment hereof.

FIG. 27 is a block diagram showing an arrangement of an image production method and system according to a fifth embodiment of the invention.

The arrangement of FIG. 27 includes identical components to those of the system arrangement according to the first embodiment hereof. Therefore, such components are represented by like reference numerals and the detailed description thereof is omitted.

The system of the fifth embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region segmenting means 8, the in-segmental-descriptive-region-image pixel counting means 9, schematic layout pattern storage means 20 for storing a schematic layout pattern of a manuscript which pattern is composed of at least one of information items about an approximate position of an illustration and an approximate position of a manuscript descriptive region, the table storage means 11a for storing a table used for decision of the schematic layout, the schematic layout pattern selecting means 12a, segmental layout pattern storage means 22 for storing a segmental manuscript layout pattern composed of at least one of information items about a number of illustrations, a size of an illustration and a position of an illustration, table storage means 11c for storing a table used for decision of a layout segment, a segmental layout pattern selecting means 12c, the illustration storage means 13, the illustration selecting means 14, the document producing means 15, the image encoding means 16 and the document output means 17.

A hardware construction for carrying out the system of the above arrangement is essentially the same as the general-purpose computer system and is shown in FIG. 2. Since this arrangement is the same as the construction of the first embodiment hereof, the description thereof is omitted.

Figure 28:
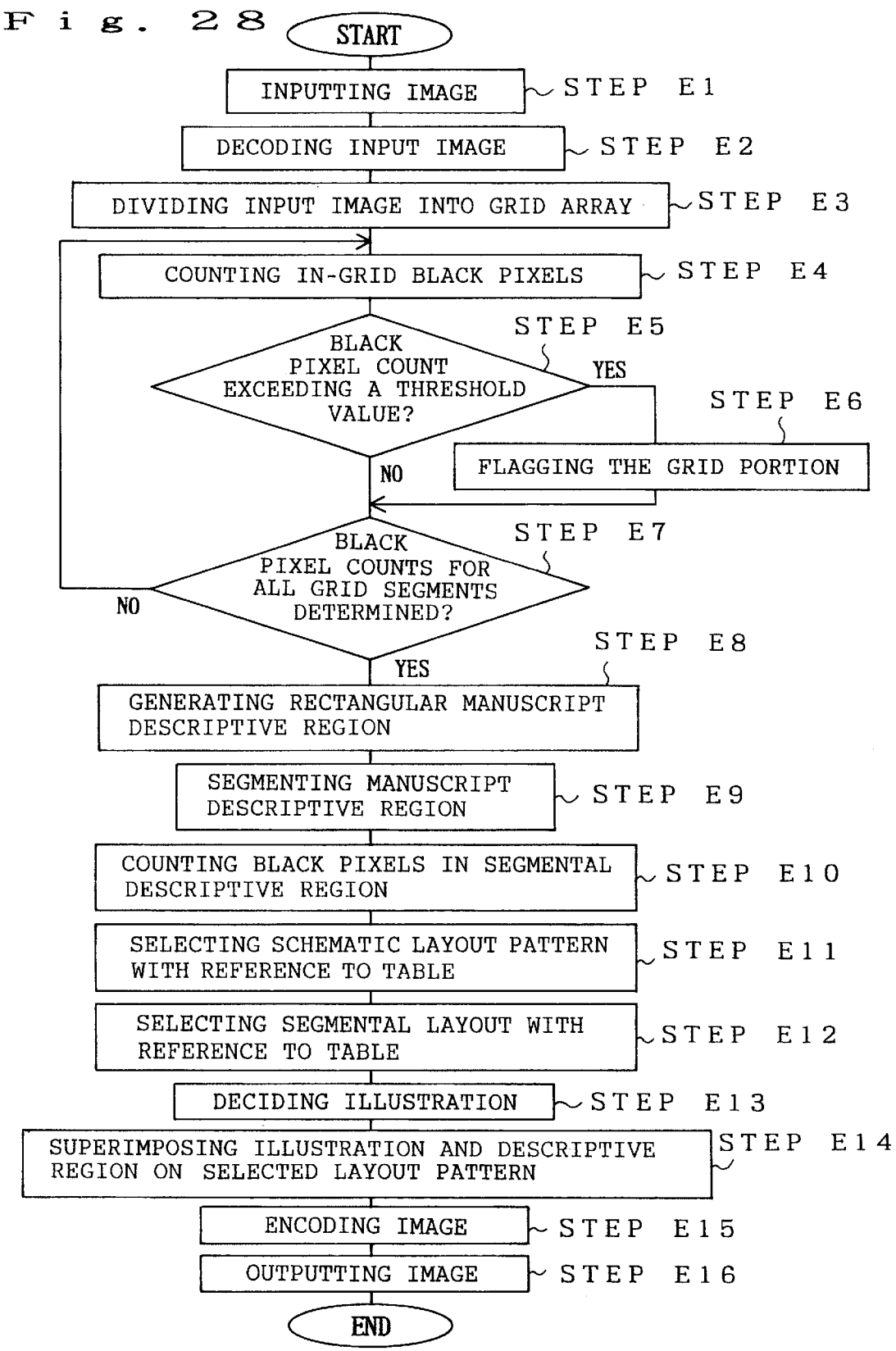
FIG. 28 is a flow chart representing steps of an image producing procedure according to the fifth embodiment hereof.

The image production method and operations of the image production system of the above arrangement are described with reference to the flow chart shown in FIG. 28.

(Steps E1 to E10)

Operations at these steps are the same as those performed at STEPs A1 to A10 shown in FIG. 3 and therefore, the description thereof is omitted.

(Step E11)

An operation at this step is the same as that performed at STEP C11 shown in FIG. 21 and therefore, the description thereof is omitted.

(Step E12)

The segmental layout pattern selecting means 12c selects a segmental layout pattern based on the schematic layout pattern selected at STEP E11 and the image characteristic value.

Figure 29:
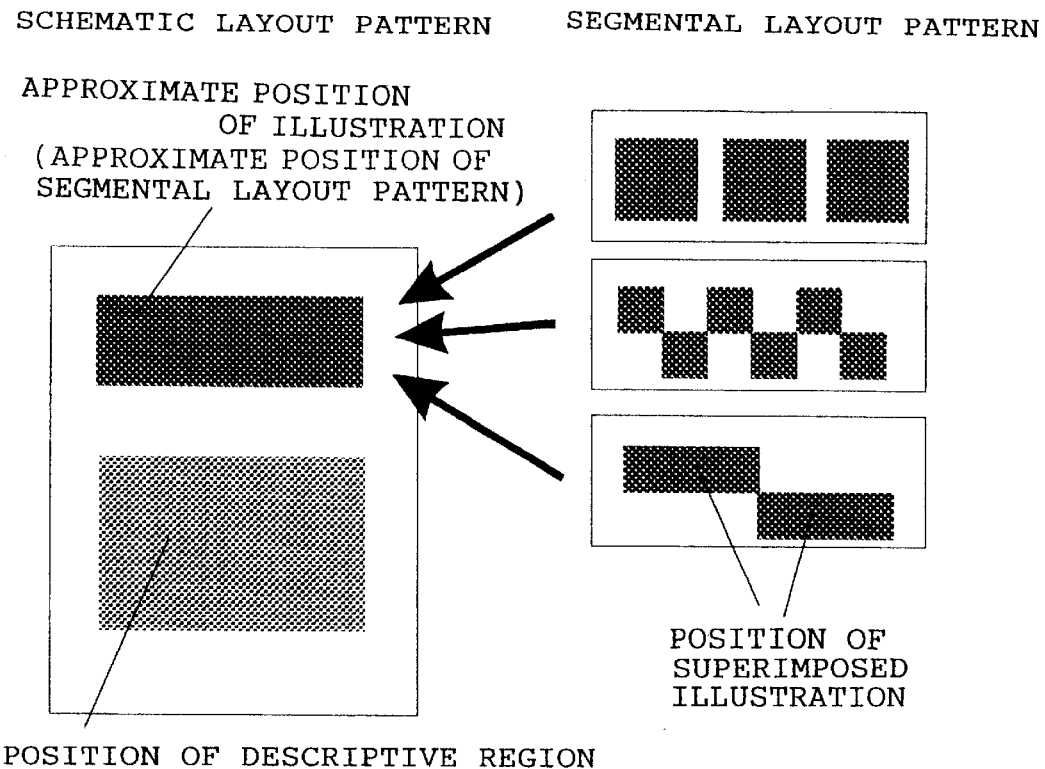
FIG. 29 is a diagram showing segmental layout patterns according to the fifth embodiment hereof.

As seen in FIG. 29, the segmental layout patterns are designed to be placed according to the positions of illustrations in the schematic layout pattern for increase in the possible layout combinations.

The selection of the segmental layout pattern is performed by using a table for selection of the segmental layout pattern, as shown in Table 4, which is stored in the table storage means 11c.

TABLE 4

| SCHEMATIC LAYOUT PATTERN | IMAGE CHARACTERISTIC VALUE | | | SEGMENTAL LAYOUT PATTERN |
|---|---|---|---|---|
| | HORIZONTAL LENGTH OF DESCRIPTIVE REGION | VERTICAL LENGTH OF DESCRIPTIVE REGION | | |
| 4 | GREAT | GREAT | | 3 |
| 4 | GREAT | MEDIUM | | 2 |
| . | . | . | | . |
| . | . | . | | . |
| . | . | . | | . |
| 4 | SMALL | GREAT | | 5 |

Figure 30:
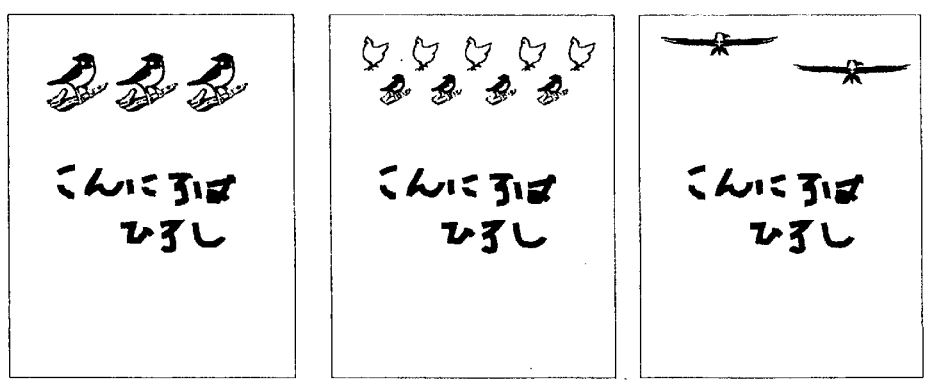
FIG. 30 is a diagram showing exemplary layouts according to the fifth embodiment hereof.

From this table, a segmental layout pattern 2, for example, is selected in conjunction with the schematic layout pattern 4 in which the descriptive region image has the small" vertical length and the great" horizontal length. This operation provides varied layouts from the same schematic layout pattern by varying the combination of the descriptive region image and the selected segmental layout patterns depending upon the state of the descriptive region image, as shown in FIG. 30.

According to this embodiment hereof, the illustration selecting means 14 serves to select the illustration. An alternative arrangement may be made such that the user himself selects the illustration and superimposes it on the illustration insertion area. In this case, optional illustrations are displayed by means of illustration display means (not shown) for allowing the user to select a desired illustration through input means such as the key board.

(Steps E13 to E16)

Operations at these steps are the same as those performed at STEPs A12 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. The operations further determine the positions of the respective images of the illustration and the manuscript descriptive region according to the state of the descriptive region image, thereby accomplishing the layout in which the images of the illustration and descriptive region are laid in balance. In addition, the segmental layout pattern fitting the image of the manuscript descriptive region image is selected so as to produce a document with a better appearance than a document of a like layout.

According to the fifth embodiment hereof, the selection of the schematic layout pattern and the segmental layout pattern is performed with reference to the tables. Instead of relying on the tables, the decision of the schematic layout pattern and the segmental layout pattern may be accomplished by performing the rule-based inference, the fuzzy inference based on the fuzzy rules or the fuzzy inference for obtaining plural outputs through the clustering procedure.

Sixth Embodiment

Figure 31:
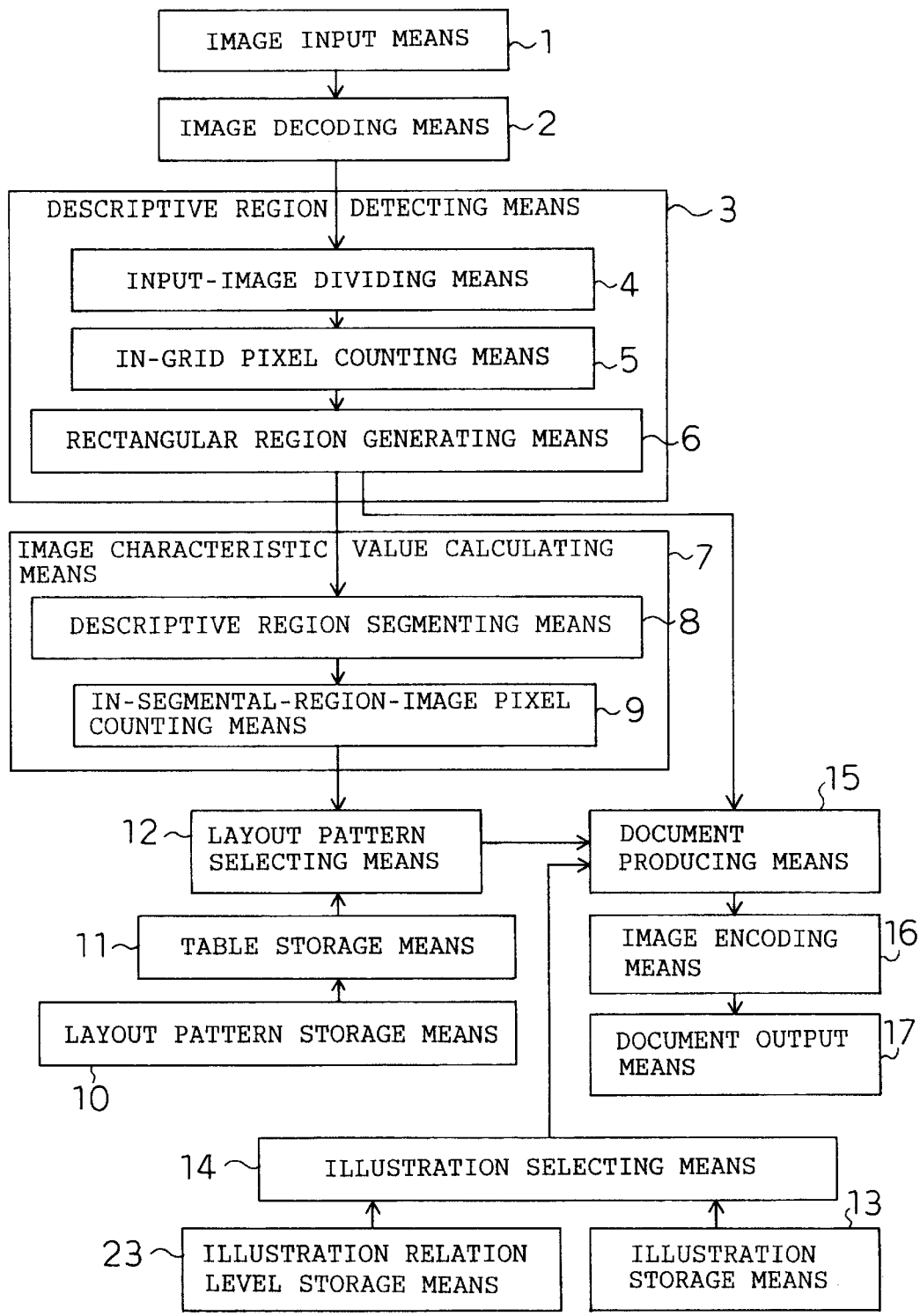
FIG. 31 is a block diagram showing a system arrangement according to a sixth embodiment hereof.

FIG. 31 is a block diagram showing an arrangement of an image production method and system according to a sixth embodiment of the invention.

The arrangement of FIG. 31 includes identical components to those of the system arrangement according to the first embodiment hereof. Therefore, such portions are represented by like reference numerals and the detailed description thereof is omitted.

The system of the sixth embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region segmenting means 8, the in-segmental-descriptive-region-image pixel counting means 9, the layout pattern storage means 10, the table storage means 11, the layout pattern selecting means 12, illustration relation level storage means 23 for storing a degree of relation between an illustration and another illustration, the illustration storage means 13, the illustration selecting means 14, the document producing means 15, the image encoding means 16 and the document output means 17.

A hardware construction for carrying out the system of the above arrangement is essentially the same as the general-purpose computer system and is shown in FIG. 2. Since this arrangement is the same as the construction of the first embodiment hereof, the description thereof is omitted.

Figure 32:
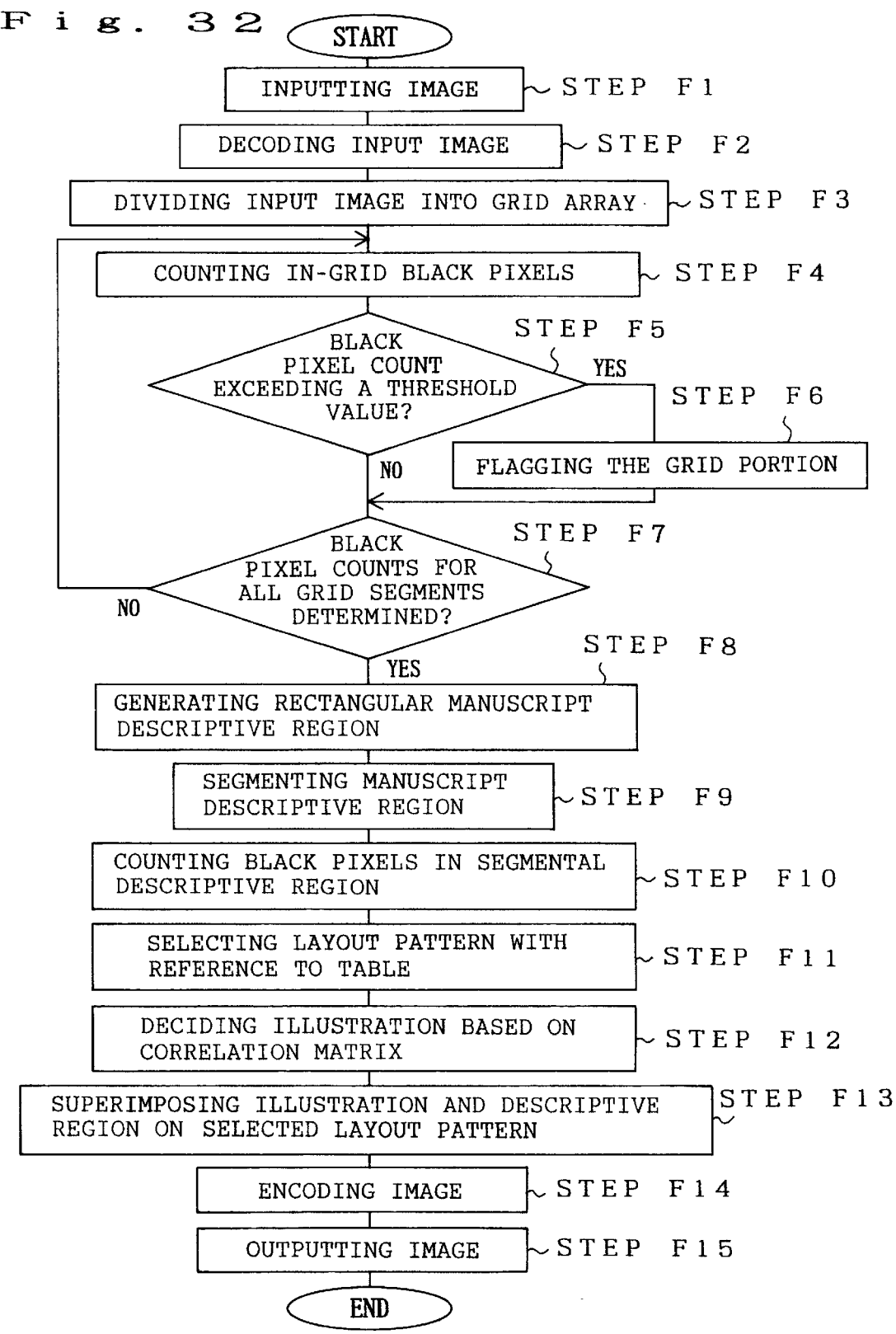
FIG. 32 is a flow chart representing steps of an image producing procedure according to the sixth embodiment hereof.

The image production method and operations of the image production system of the above arrangement are described with reference to the flow chart shown in FIG. 32.

(Steps F1 to F12)

Operations at these steps are the same as those performed at STEPs A1 to A11 shown in FIG. 3 and therefore, the description thereof is omitted.

(Step F12)

An illustration to be superimposed on a document is decided based on the decided layout pattern.

The illustration decision takes the following procedure.

First one illustration is selected. Any method may be used for this decision, which may be made, for example, based on random number.

Subsequently, the other illustrations are selected. In a case where a total number of three illustrations are selected, the other two illustrations are selected. Each illustration has a predetermined degree of relation with any of the other illustrations. Such relation levels are expressed in the form of correlation matrix, as shown in FIG. 33.

If an illustration No.4 is the first to be selected, an illustration having a greater degree of relation therewith is selected from the correlation matrix of FIG. 33. The illustrations listed in the order of greater degree of relation with the illustration No.4 are No.2, No.1 and No.3. Illustrations having a first and a second greatest degree of relation are selected. Therefore, the illustrations Nos.2 and 1 are selected in this example.

It is to be noted that according to this example, the relations of the illustrations No.4 versus No.2 and of No.4 versus No.1 are great but the relation of the illustrations No.1 versus No.2 is not so great. Accordingly, the selection may be made such that the three selected illustrations present the greatest mean value of relation among them.

(Steps F13 to F15)

Operations at these steps are the same as those performed at STEPs A13 to A15 shown in FIG. 3 and therefore, the description thereof is omitted.

The aforementioned sequence of document production operations automatically detect the descriptive region of a manuscript and add the illustration thereto based on only limited necessary items entered to the manuscript by the user. Furthermore, the operations determine the positions of the respective images of the illustration and the manuscript descriptive region according to a state of the descriptive region image, thereby accomplishing the layout in which the images of the illustration and descriptive region are laid in balance.

In addition, such illustrations as related to one another are selected from great illustration data and added to the produced document, which features a better coordination than a document with illustrations simply added thereto.

Seventh Embodiment

Figure 34:
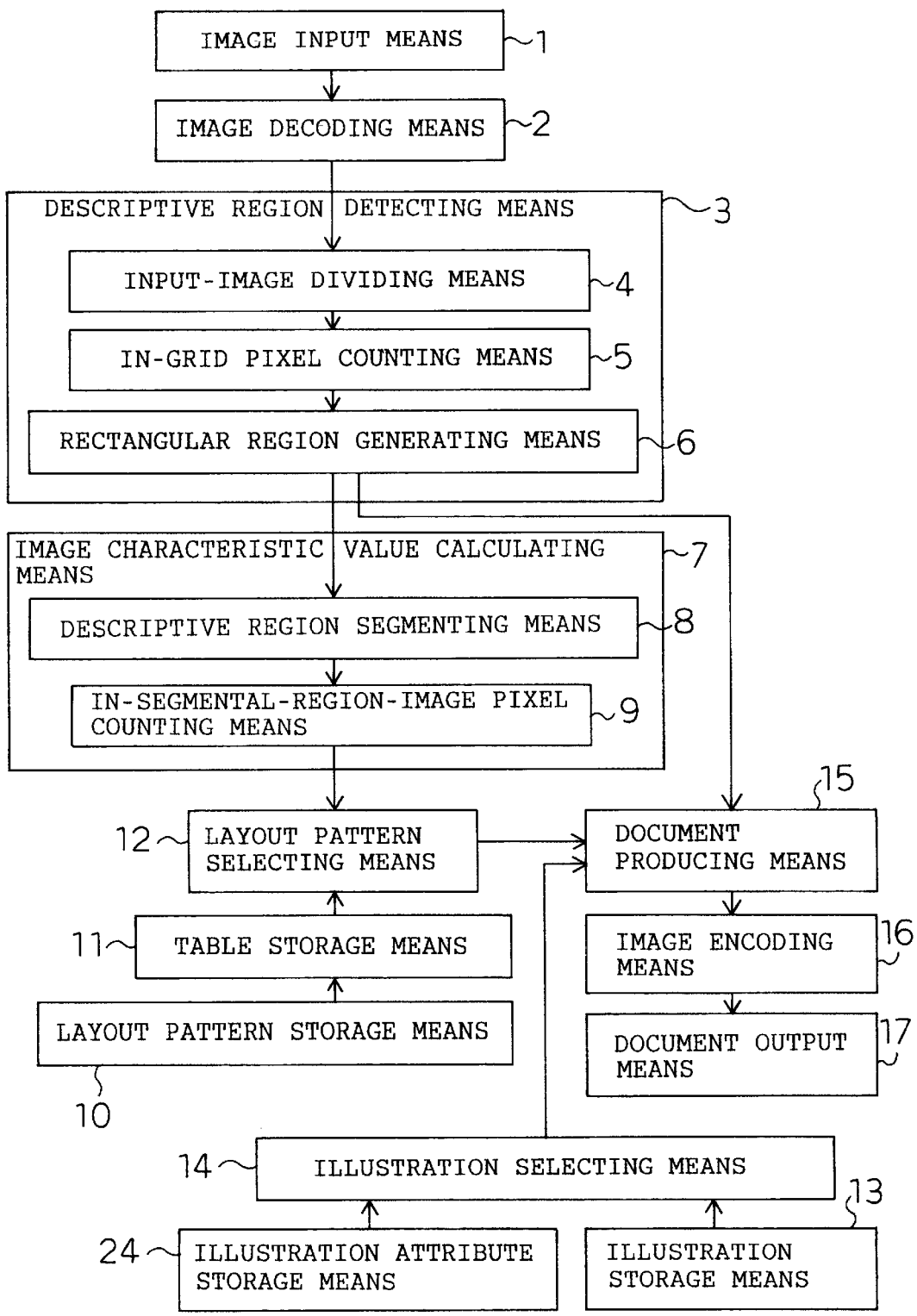
FIG. 34 is a block diagram showing a system arrangement according to a seventh embodiment hereof.

FIG. 34 is a block diagram showing an arrangement of an image production method and system according to a seventh embodiment of the invention.

The arrangement of FIG. 34 includes identical components to those of the system arrangement according to the first embodiment hereof. Therefore, such components are represented by like reference numerals and the detailed description thereof is omitted.

The system of the seventh embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region image segmenting means 8, the in-segmental-descriptive-region-image pixel counting means 9, the layout pattern storage means 10, the table storage means 11, the layout pattern selecting means 12, illustration attribute storage means 24 for storing attributes of season or time which are imparted to the respective illustrations according to contents thereof, the illustration storage means 13, the illustration selecting means 14, the document producing means 15, the image encoding means 16 and the document output means 17.

A hardware construction for carrying out the system of the above arrangement is essentially the same as the general-purpose computer system and is shown in FIG. 2. Since this arrangement is the same as the construction of the first embodiment hereof, the description thereof is omitted.

Figure 35:
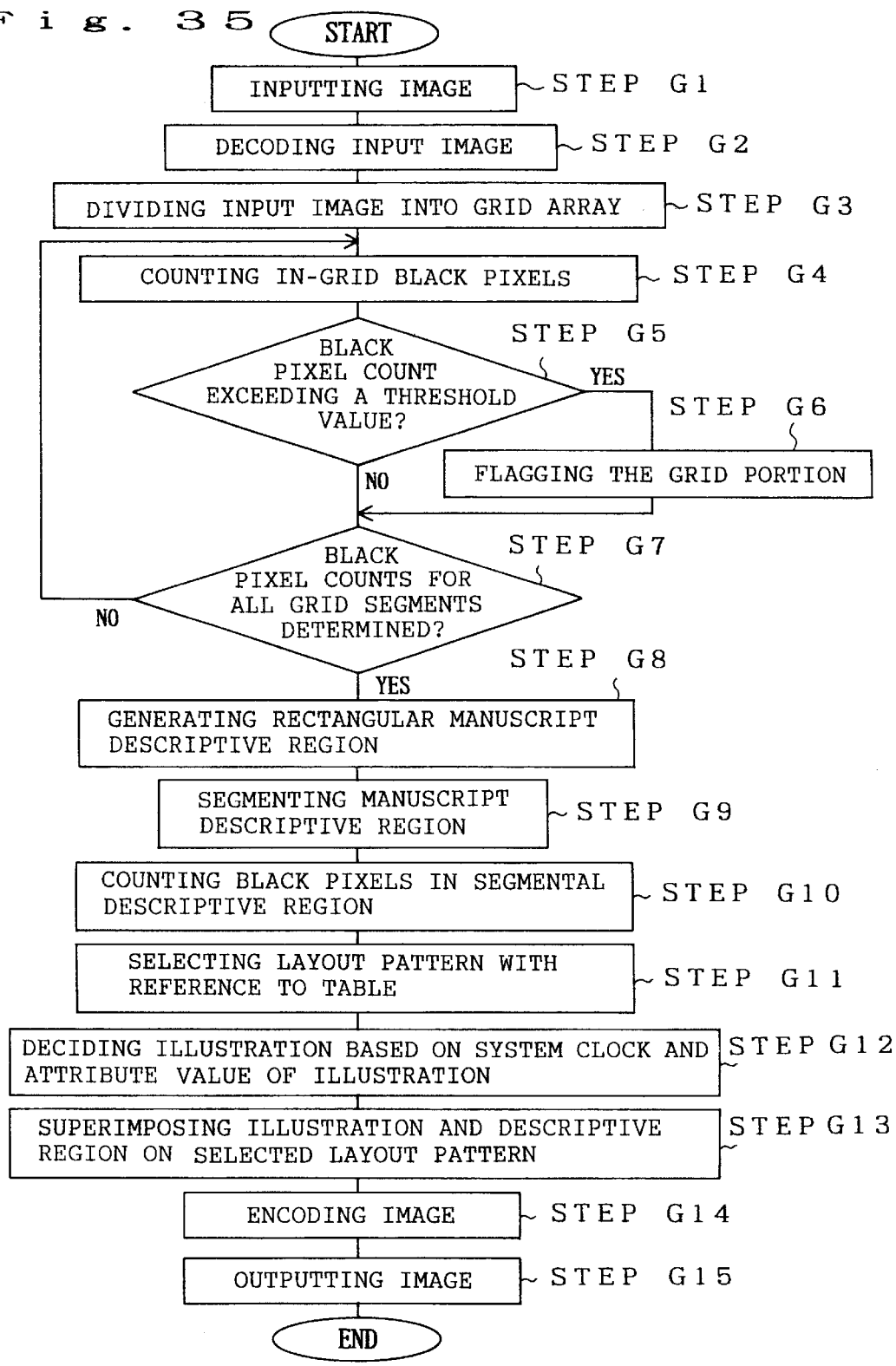
FIG. 35 is a flow chart representing steps of an image producing procedure according to the seventh embodiment hereof.

The image production method and operations of the image production system of the above arrangement are described with reference to the flow chart shown in FIG. 35. (Steps G1 to G11)

Operations at these steps are the same as those performed at STEPs A1 to A11 shown in FIG. 3 and therefore, the description thereof is omitted.
(Step G12)

An illustration to be superimposed on the document is selected based on the decided layout pattern.

As shown in FIG. 2, the hardware of this embodiment hereof is constructed the same way as the general-purpose computer system, hence permitting the use of a system clock.

Thus, a date and time are acquired from the system clock when the document is produced.

Each illustration data piece stored in the illustration attribute storage means includes a piece of information about suitable date and time to be selected. For example, a certain illustration is imparted with an attribute values such as May, June", 20:00–24:00" and the like. Accordingly, when the document is produced, the illustration selecting means 14 refers to the system clock for selection of an illustration having attribute values suitable for the date and time of the document production.
(Steps G13 to G15)

Operations at these steps are the same as those performed at STEPs A13 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to the state of the descriptive region image, thereby accomplishing the layout in which the images of the illustration and descriptive region are laid in balance.

In addition, such illustrations as related to one another are selected from great illustration data and added to the produced document, which features a better coordination than a document with illustrations simply added thereto.

Eighth Embodiment

Figure 36:
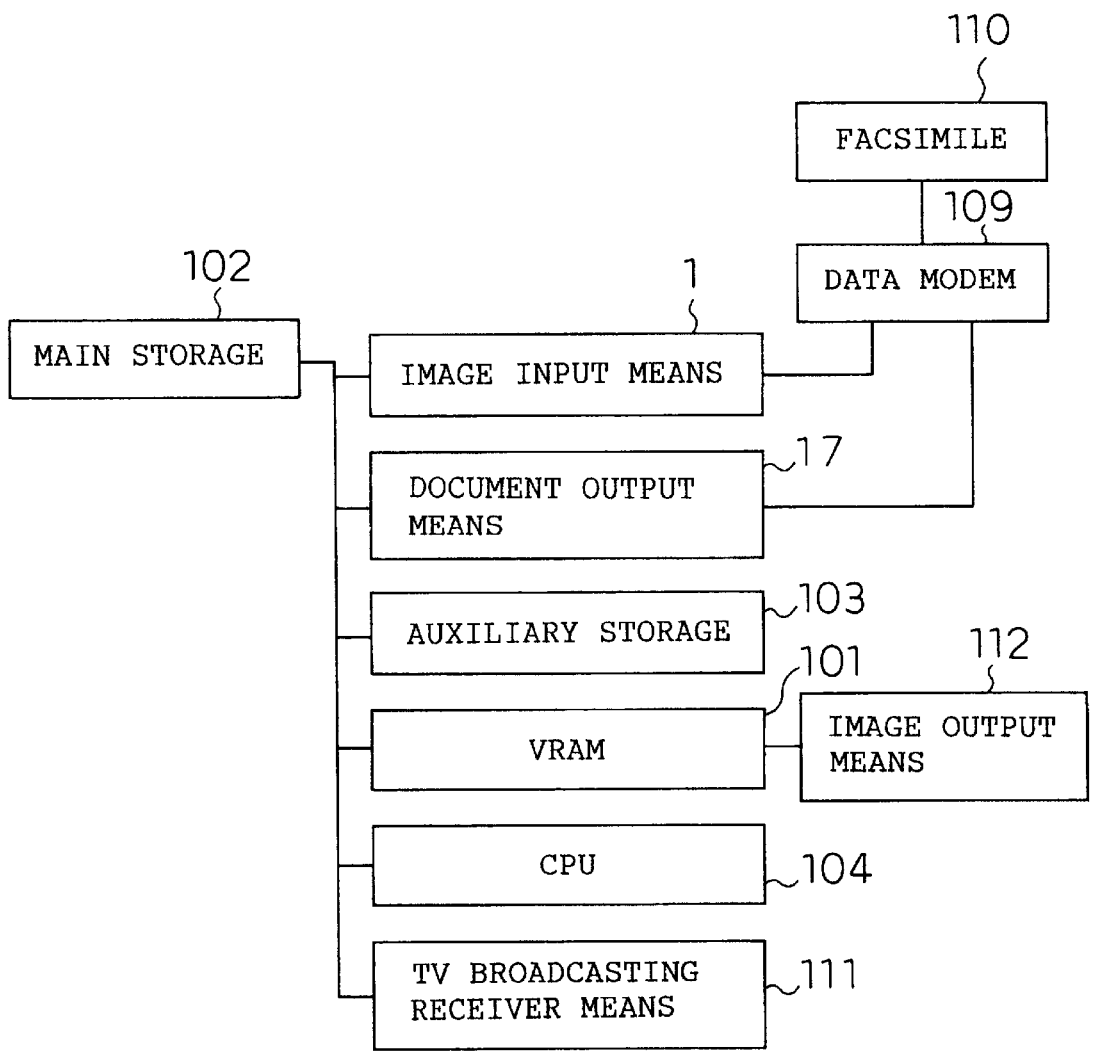
FIG. 36 is a block diagram showing a hardware construction of the system according to an eighth embodiment hereof.

FIG. 36 is a block diagram showing an arrangement of an image production method and a hardware construction of a system according to an eighth embodiment of the invention.

The arrangement of FIG. 36 is essentially the same as that of the general-purpose computer system. Further, FIG. 36 includes identical components to those of the system arrangement according to the first embodiment hereof. Therefore, such components are represented by like reference numerals and the detailed description thereof is omitted.

The system shown in FIG. 36 includes the image input means 1, the document output means 17, the VRAM 101, the main storage 102, the auxiliary storage 103, the CPU 104, the data modem 109, the facsimile 110, TV-broadcasting receiver means 111 for receiving TV broadcasting, and image output means 112 for outputting TV broadcast images.

The data modem 109 is connected to the facsimile 110 via the telephone line.

The data modem is also connected to the image input means 1 and the image output means 17. Accordingly, the system of this embodiment is adapted to use a manuscript inputted via the facsimile 110 for production of an illustrated document according to the procedure taken by the first to the sixth embodiments hereof and then to output the resultant document to the facsimile 110.

Furthermore, the TV broadcasting receiver means 111 serves to receive TV broadcast image signals, which are outputted by the image output means 112. A monitor (not shown) may be connected to the image output means 112 thereby displaying TV broadcast images or permitting the user to check an image of the document being produced.

Ninth Embodiment

Figure 37:
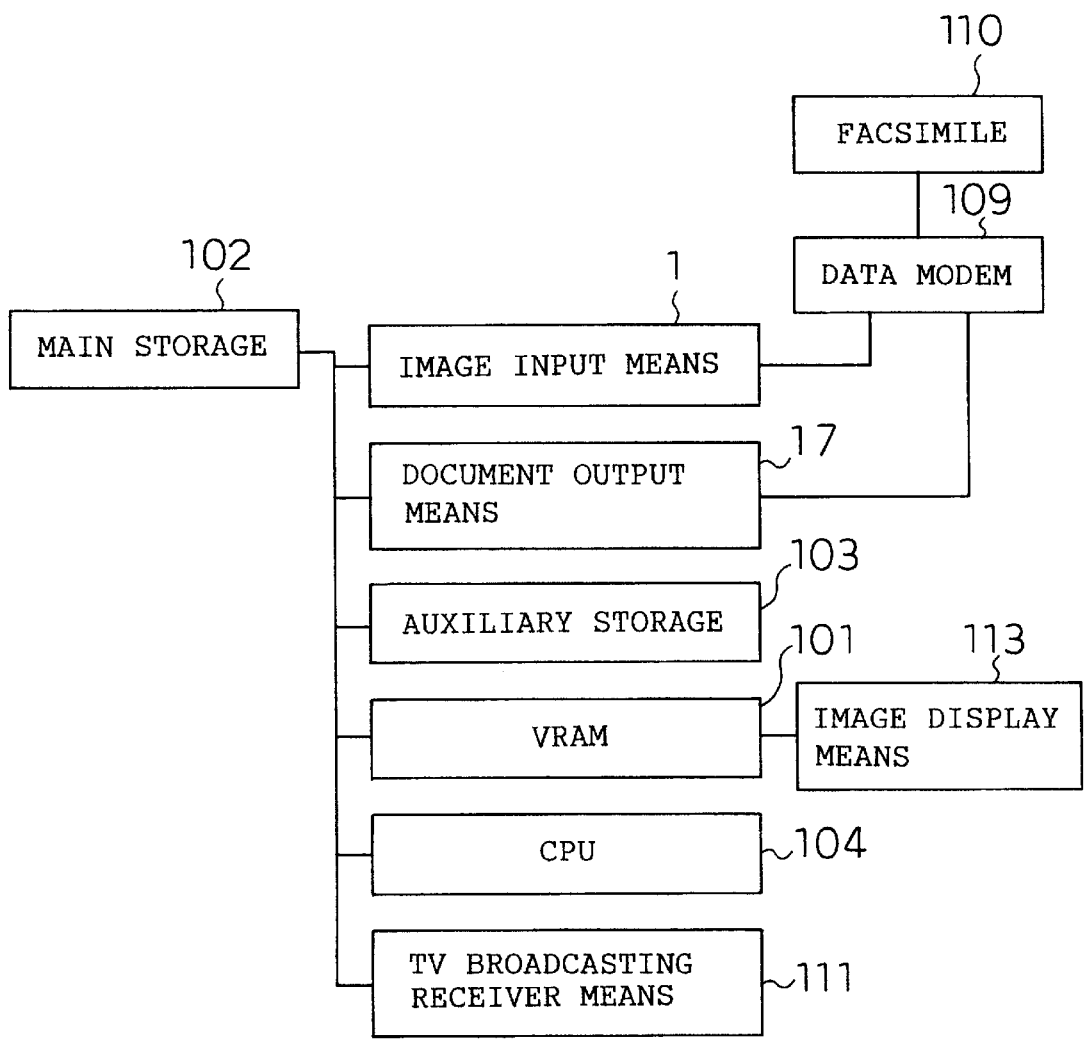
FIG. 37 is a block diagram showing a hardware construction of the system according to a ninth embodiment hereof.
Figure 38:
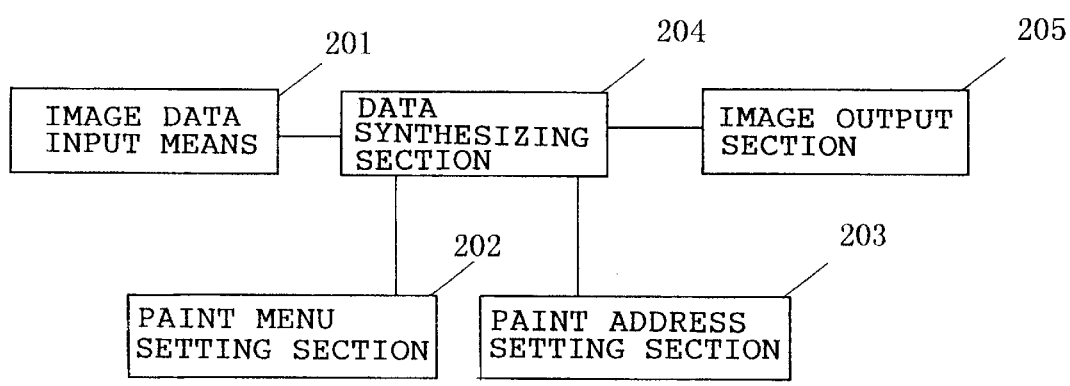
FIG. 38 is a block diagram showing an exemplary system arrangement of the prior art.

FIG. 37 is a block diagram showing an arrangement of an image production method and a hardware construction of a system according to a ninth embodiment of the invention.

The arrangement of FIG. 37 is essentially the same as that of the general-purpose computer system. Further, the arrangement of FIG. 37 includes identical components to those of the system arrangement according to the first embodiment hereof. Therefore, such components are represented by like reference numerals and the description thereof is omitted.

The system shown in FIG. 36 includes the image input means 1, the document output means 17, the VRAM 101, the main storage 102, the auxiliary storage 103, the CPU 104, the data modem 109, the facsimile 110, TV-broadcasting receiver means 111 for receiving TV broadcasting, and image display means 113 for displaying the TV broadcast images.

The data modem 109 is connected to the facsimile 110 via the telephone line.

The data modem is also connected to the image input means 1 and the image output means 17. Accordingly, the system of this embodiment is adapted to use the manuscript inputted via the facsimile 110 for production of the illustrated document according to the procedure taken by the first to the sixth embodiments hereof and then to output the resultant document to the facsimile 110.

Furthermore, the images received by the TV-broadcasting receiver means 111 may be displayed by the image display means 113. The image display means also permits the user to check an image of the document being produced.

Tenth Embodiment

Figure 39:
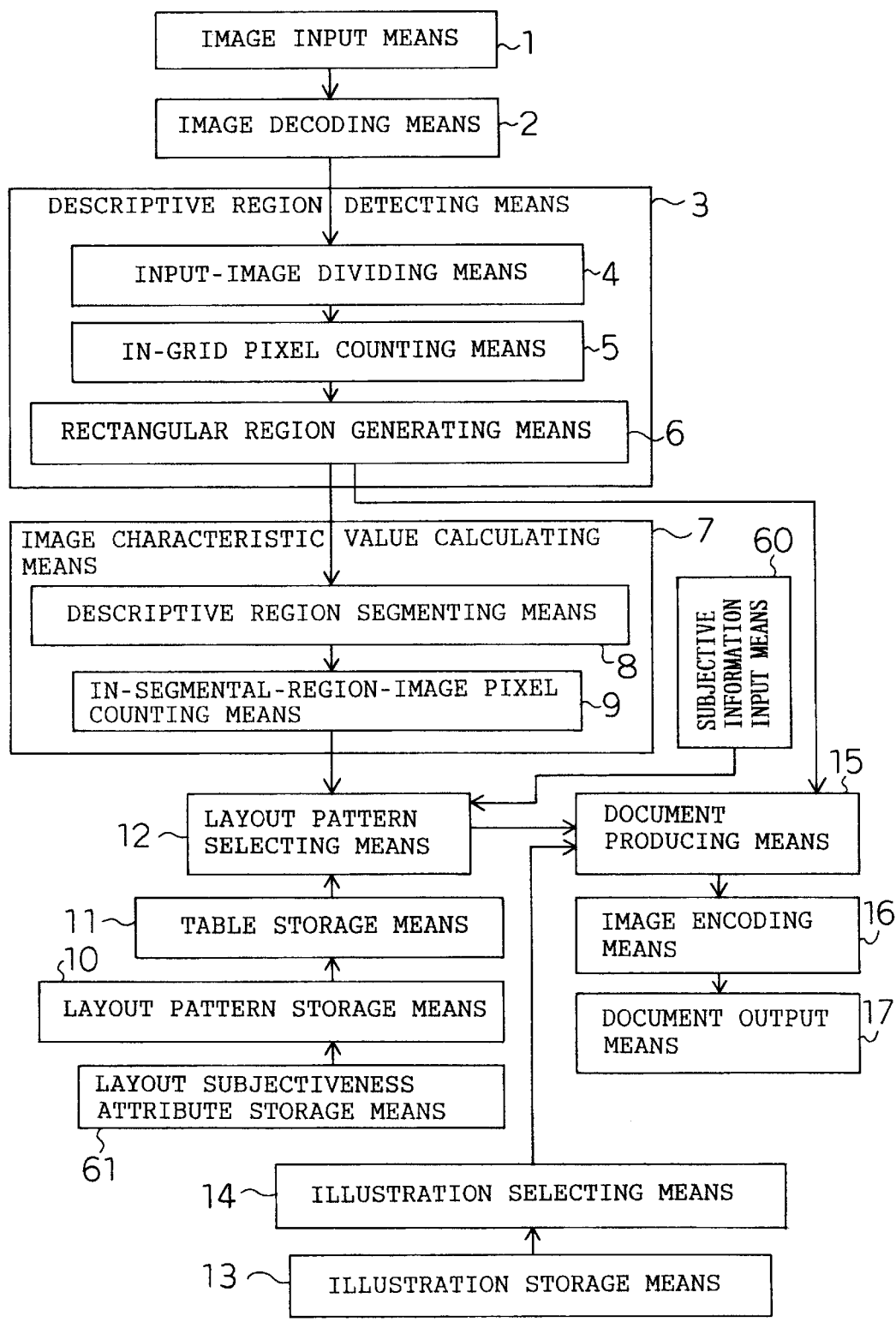
FIG. 39 is a block diagram showing a system arrangement according to a tenth embodiment hereof.

FIG. 39 is a block diagram showing an arrangement of an image production method and system according to a tenth embodiment of the invention.

The arrangement FIG. 39 includes identical components to those of the system arrangement according to the first embodiment hereof. Therefore, such components are represented by like reference numerals and the detailed description thereof is omitted.

The system of the tenth embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region image segmenting means 8, the in-segmental-descriptive-region-image pixel counting means 9, the layout pattern storage means 10, the table storage means 11, the layout pattern selecting means 12, the illustration storage means 13, the illustration selecting means 14, the document producing means 15, the image encoding means 16, the document output means 17, subjective information input means 60 for inputting subjective information of the user, and layout subjectiveness attribute storage means 61 for storing subjectiveness attributes of the layout patterns.

A hardware construction for carrying out the system of the above arrangement is essentially the same as the general-purpose computer system and is shown in FIG. 2. Since this arrangement is the same as the construction of the first embodiment hereof, the description thereof is omitted.

Figure 40:
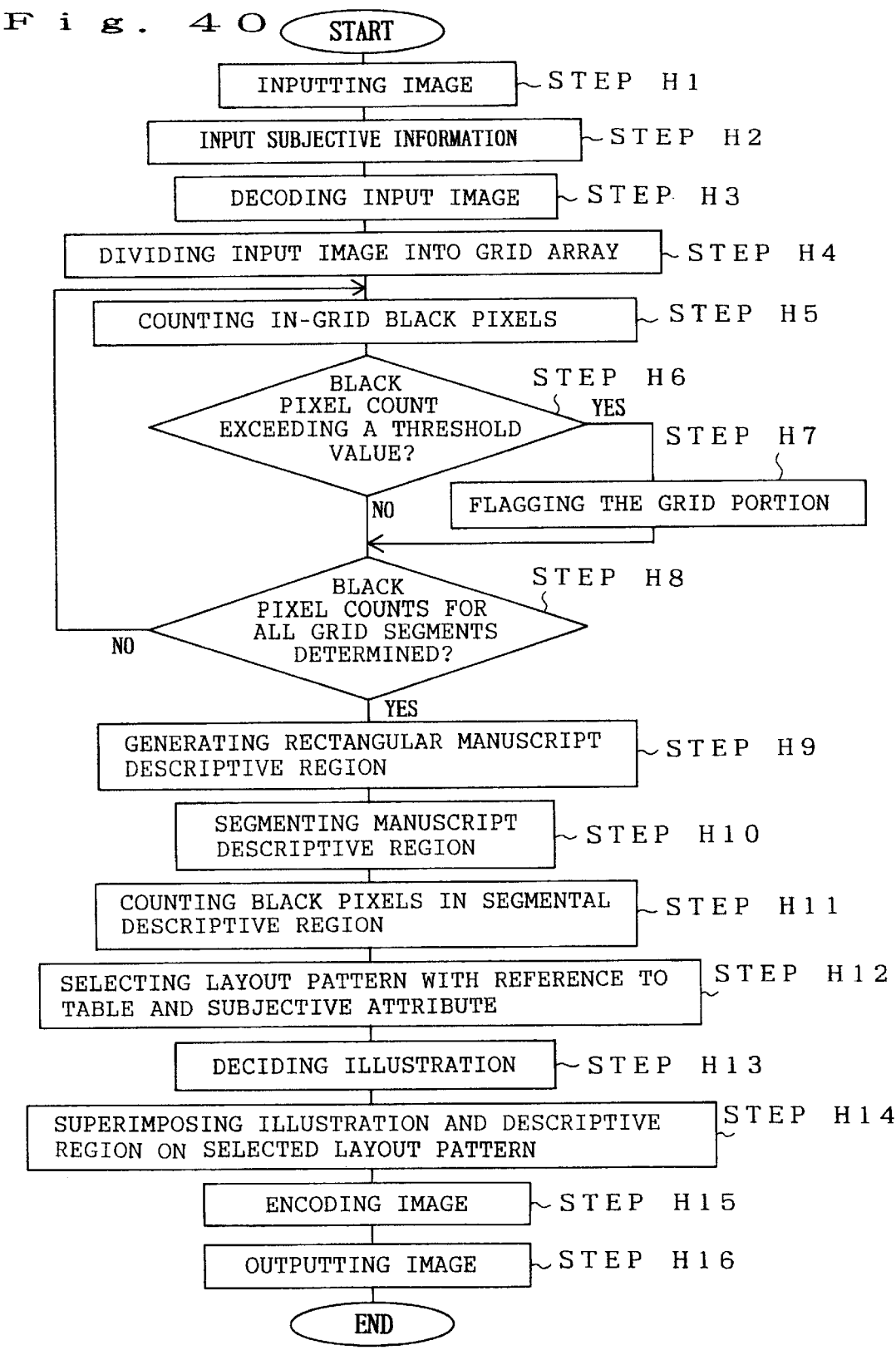
FIG. 40 is a flow chart representing steps of an image producing procedure according to the tenth embodiment hereof.
Figure 41:
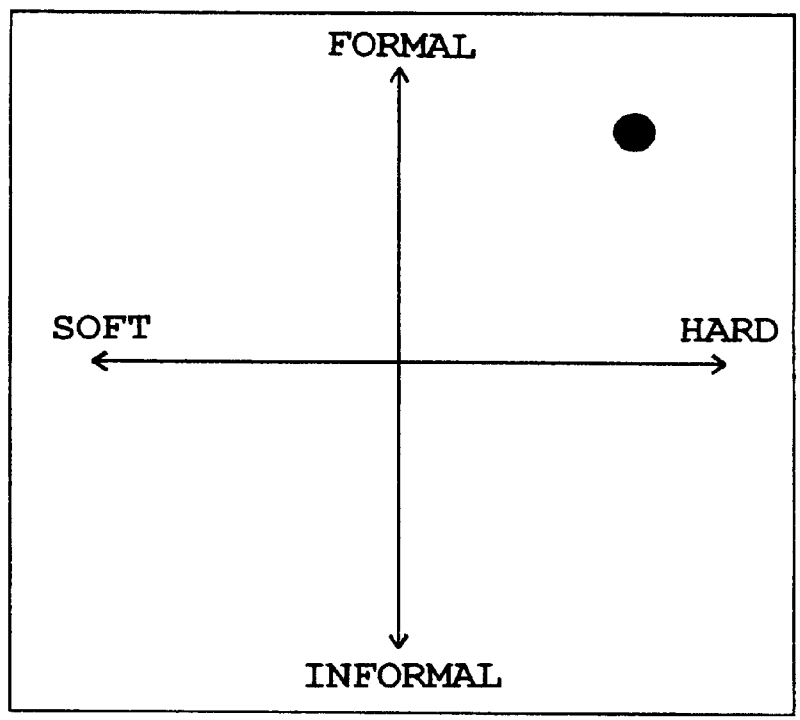
FIG. 41 is a diagram showing a subjectiveness input interface according to the tenth embodiment hereof.

The image production method and operations of the image production system of the above arrangement are described with reference to the flow chart shown in FIG. 40.
(Step H1)
An operation at this step is the same as that performed at STEP A1 shown in FIG. 3 and therefore, the description thereof is omitted.
(Step H2)
At this step, the user uses the subjective information input means 60 for entering the user's subjectiveness and desired style of a produced document in subjective terms. For example, an interface shown in FIG. 41 is presented such that the user may enter subjective levels of between hard" and soft" and of between formal" and informal". According to the figure, a very formal and very hard" style of document is desired. Examples of other subjective terms include simple", complicated", light", heavy" and the like.
(Steps H3 to H11)
Operations at these steps are the same as those performed at STEPs A2 to A10 and therefore, the description thereof is omitted.
(Step H12)
A layout pattern is selected by referring the image characteristic value to the table. Each layout pattern is imparted with a subjectivenes attributes which is stored in the layout subjectiveness attribute storage means 61. As to a certain layout pattern, for example, a subjective term and a degree thereof, such as formal=0.5", are described. At this step, which layout pattern to select is decided based on the user s subjectiveness inputted at STEP H2. The decision is made by the known method (Literature 2: Miura et al., Construction of User Model in WWW Query by Subjective Description System KiSS", IPS HI Report 96-HI69-4, 1996).

After some layout pattern options are selected in this manner, a suitable layout pattern is decided from the table.
(Step H13 to H16)
Operations at these steps are the same as those performed at STEPs A12 to A15 and therefore, the description thereof is omitted.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to the state of the descriptive region image, thereby accomplishing the layout in which the images of the illustration and descriptive region are laid in balance.

In addition, the subjective information entered by the user is also taken into consideration thereby to provide the document of a layout close to the user's intention.

Incidentally, the tenth embodiment hereof is carried out by adding the subjective information input means 60 and the layout subjectiveness attribute storage means 61 to the first embodiment hereof. It is to be understood that these means are applicable to any one of the second to the ninth embodiments of the invention.

Eleventh Embodiment

Figure 42:
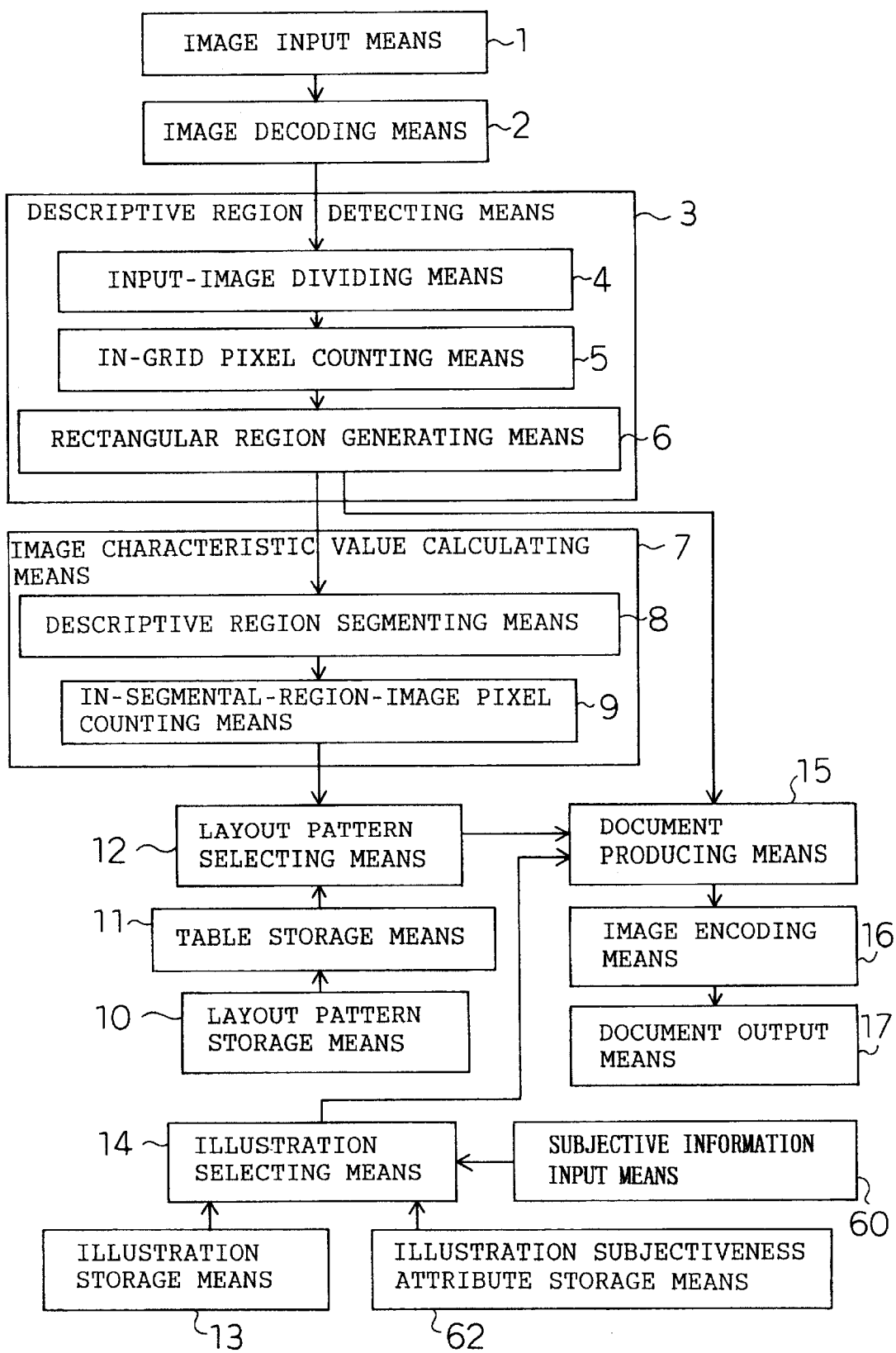
FIG. 42 is a block diagram showing a system arrangement according to an eleventh embodiment hereof.

FIG. 42 is a block diagram showing an arrangement of an image production method and system according to an eleventh embodiment of the invention.

The arrangement of FIG. 42 includes identical components to those of the system arrangement according to the first embodiment hereof. Therefore, such components are represented by like reference numerals and the detailed description thereof is omitted.

The system of the eleventh embodiment hereof includes the image input means 1, the image decoding means 2, the descriptive region detecting means 3, the input-image dividing means 4, the in-grid pixel counting means 5, the rectangular region generating means 6, the image characteristic value calculating means 7, the descriptive region image segmenting means 8, the in-segmental-descriptive-region-image pixel counting means 9, the layout pattern storage means 10, the table storage means 11, the layout pattern selecting means 12, the illustration storage means 13, the illustration selecting means 14, the document producing means 15, the image encoding means 16, the document output means 17, the subjective information input means 60 for inputting subjective information of the user, and illustration subjectiveness attribute storage means 62 for storing subjectiveness attributes of the illustrations.

A hardware construction for carrying out the system of the above arrangement is essentially the same as the general-purpose computer system and is shown in FIG. 2. Since this arrangement is the same as the construction of the first embodiment hereof, the description thereof is omitted.

The image production method and operations of the image production system of the above arrangement are described with reference to the flow chart shown in FIG. 43.

(Step I1)

An operation at this step is the same as that performed at STEP A1 shown in FIG. 3 and therefore, the description thereof is omitted.

(Step I2)

At this step, the user uses the subjective information input means 60 for entering the user's subjectiveness and desired style of a produced document in subjective terms.

(Steps I3 to I12)

Operations at these steps are the same as those performed at STEPs A2 to A11 shown in FIG. 3 and therefore, the description thereof is omitted.

(Step I13)

There is selected an illustration to be superimposed on the document based on the decided layout pattern. For assistance in the illustration decision, each illustration is imparted with a subjectiveness attribute, which is stored in the illustration subjectiveness attribute storage means 62. As to a certain illustration, for example, a subjective term and a degree thereof, such as soft=0.5", are described. At this step, which illustration to select is decided based on the user's subjective information inputted at STEP H2. The decision is made by the known method (Literature 2: Miura et al., Construction of User Model in WWW Query by Subjective Description System KiSS", IPS HI Report 96-HI69-4, 1996); incorporated therein by reference.

(Steps I14 to I16)

Operations at these steps are the same as those performed at STEPs A13 to A15 shown in FIG. 3 and therefore, the description thereof is omitted.

The aforementioned sequence of document production operations automatically detect the descriptive region of the manuscript and add the illustration thereto based on only limited necessary items entered to the manuscript by the user. Furthermore, the operations determine the positions of the respective images of the illustration and the manuscript descriptive region according to the state of the descriptive region image, thereby accomplishing the layout in which the images of the illustration and descriptive region are laid in balance.

In addition, the subjective information entered by the user is also taken into consideration thereby to provide the document of a style close to the user s intention.

Incidentally, the eleventh embodiment hereof is carried out by adding the subjective information input means 60 and the illustration subjectiveness attribute storage means 62 to the first embodiment hereof. It is to be understood that these means are applicable to any one of the second to the ninth embodiments of the invention.

According to the invention, there may be a case where the layout pattern includes no illustration, consisting only of the descriptive region. In this case, the illustration is not superimposed. Such a case is also included in the scope of the invention.

The invention further relates to a program information storage medium which contains a program for carrying out, by means of the computer, all or a part of the steps of the methods or all or a part of the functions of the means of the systems according to the foregoing embodiments hereof as well as set forth in the accompanying claims.

It is to be understood that the invention may be carried out by means of dedicated hardware circuitry for performing the functions of the components hereof. Otherwise, the invention may be carried out by means of the computer utilizing a program software for performing these functions.

A fuzzy inference method and machine according to the invention are arranged such that inference results are subject to a clustering procedure for dynamically changing the number of outputs of defuzzification. Therefore, the defuzzification provides a real value reflecting the inference results more effectively.

An image production method and system according to the invention are arranged such that a manuscript layout pattern including at least one of information items about a number of illustrations, a size and position of an illustration and a position of an image of a manuscript descriptive region is selected based on image characteristic values such as of a horizontal length, a vertical length, a mean pixel luminance, a color tone, a luminance distribution, a luminance centroid and the like of the image of the descriptive region exclusive of a background portion of an input image. This permits the output of a document featuring a layout varied according to the input image.

An image production method and system according to the invention are arranged such that a manuscript schematic layout pattern including at least one of information items about an approximate position of an illustration and an approximate position of an image of a manuscript descriptive region is selected based on image characteristic values such as of a horizontal length, a vertical length, a mean pixel luminance, a color tone, a luminance distribution, a luminance centroid and the like of the image of the descriptive region exclusive of a background portion of an input image, and then the selected layout is subject to fine adjustment. This permits the production of a document more oriented to the manuscript.

An image production method and system according to the invention are arranged such that a manuscript schematic layout pattern including at least one of information items about approximate positions of an illustration and an image of a manuscript descriptive region is selected based on image characteristic values such as of a horizontal length, a vertical length, a mean pixel luminance, a color tone, a luminance distribution, a luminance centroid and the like of the image of the descriptive region exclusive of a background portion of an input image, while segmental layout patterns to be laid based on the schematic layout pattern are selected. This is effective to increase the coordination of the layout pattern for permitting the production of documents featuring greater layout variations.

An image production method and system according to the invention are arranged such that a table is used for selecting the layout pattern. This provides an easy selection of the layout pattern at reduced computation costs.

An image production method and system according to the invention are arranged such that a rule-based inference is performed for the layout pattern selection. Hence, the layout pattern selection may be accomplished through inference on a non-linear relation without using a vast table.

An image production method and system according to the invention are arranged such that a fuzzy inference based on fuzzy rules is performed for the layout pattern selection. Hence, the layout pattern selection may be accomplished through a simple inference on a non-linear relation.

An image production method and system according to the invention are arranged such that the fuzzy rules are applied to the layout pattern selection and a clustering procedure is taken prior to a defuzzification processing for providing one or more outputs. This permits the fuzzy inference results to be more effectively incorporated in the layout pattern selection.

An image production method and system according to the invention are arranged such that a correlation matrix of illustrations is used for selecting an illustration unit of a greater relation. Hence, there may be produced a document featuring a good coordination of illustrations.

An image production method and system according to the invention are arranged such that an attribute value of season or time imparted to each illustration based on a content thereof is used for the illustration selection. This permits the selection of an illustration fitting a season or time when the document is produced. Hence, there may be produced documents suitable for time of year.

An image production system according to the invention is arranged such that a facsimile machine is employed as image input means for inputting an image. This permits an optional manuscript to be readily inputted via a telephone line.

An image production system according to the invention is arranged such that a text font entered through a keyboard, as the image input means for inputting the image, is expanded into an image thereby to generate an input image. Hence, the input image may readily be generated.

An image production system according to the invention is arranged such that the facsimile machine is employed as document output means for outputting the produced documents. Hence, the produced documents may readily be outputted via the telephone line.

An image production system according to the invention is embodied in the form of a facsimile machine comprising an image production system of the invention and a scanner serving as the image input means which optically reads the manuscript. Hence, the illustrated documents may readily be produced in a manner as simple as that fax data is normally transmitted or received.

An image production system according to the invention further comprises TV broadcasting receiver means for receiving TV broadcasting, and image output means for outputting image information inclusive of TV broadcast information received by the TV broadcasting receiver means. Hence, merely connected to a monitor, this image production system provides an easy checking of an image of a produced document.

An image production system according to the invention further includes TV broadcasting receiver means for receiving TV broadcasting, and image display means for displaying image information inclusive of TV broadcast information received by the TV broadcasting receiver means. Hence, this image production system alone permits an image of a produced document to be checked.

An image production method and system according to the invention are arranged such that user's subjectiveness is inputted for selection of a layout pattern which fits the user's subjectiveness. Hence, there may be produced a document of a layout close to the user's intention.

An image production method and system according to the invention are arranged such that user's subjectiveness is inputted for selecting an illustration pattern which fits the user's subjectiveness. Hence, there may be produced a document added with an illustration close to the user s intention.

What is claimed is:

1. A fuzzy inference method for selecting a layout pattern on a display, performed by a computer, for inference based on fuzzy rules stated in the if-then form, comprising the steps of:
    (a) performing fuzzy inference based on the fuzzy rules to obtain inference results,
    (b) clustering the inference results into at least one cluster unit, after performing the fuzzy inference,
    (c) determining an integer value corresponding to a number of cluster units,
    (d) defuzzificating each of the cluster units based on the integer value determined in step (c) for producing a separate real value for each of the cluster units, and
    (e) selecting a layout pattern on the display as a function of the real values produced from the defuzzification.

2. A program storage medium for use in the method as set forth in claim 1, which medium serves to store a program for carrying out all or part of the steps of the method.

3. The method of claim 1 in which said defuzzificating step includes obtaining a plurality of real values for each unit of the clustered inference results.

4. The method of claim 1 including
    clustering the inference results into more than one cluster unit, after performing the fuzzy inference,
    determining the integer value as a value greater than one, and
    defuzzificating each of the cluster units to produce multiple real values based on the integer value determined to have a value greater than one.

5. A fuzzy inference computing machine for selecting a layout pattern on a display comprising:
    fuzzy rule storage means of storing fuzzy rules;
    fuzzy inference means of performing fuzzy inference based on the fuzzy rules stored in said fuzzy rule storage means to obtain inference results;
    clustering means of clustering said inference results into at least one cluster unit and determining an integer value corresponding to a number of cluster units;
    defuzzificating means of defuzzificating each of the cluster units based on the integer value to produce a separate real value for each of the cluster units; and
    selection means of selecting a layout pattern on the display as a function of the real values produced from the defuzzificating means.

6. A program information storage medium for use in the computing machine as set forth in claim 5, which medium serves to store a program for carrying out all or part of the means of the computing machine.

7. The fuzzy inference computing machine of claim 5 wherein:
    the clustering means includes means of clustering the inference results into more than one cluster unit and determining the integer value as a value greater than one, and
    the defuzzificating means includes means of defuzzificating each of the cluster units to produce multiple real values based on the integer value having the value greater than one.

8. A fuzzy inference method performed by a computer for selecting a layout pattern on a display comprising the steps of:
    (a) storing a plurality of objects:
    (b) selecting attributes of a parameter under examination;
    (c) storing a plurality of fuzzy rules for each attribute selected in step (b), in which each fuzzy rule provides a degree for favoring each object stored in step (a);
    (d) calculating a characteristic value for at least one attribute selected in step (b);
    (e) selecting sets of fuzzy rules from the plurality of fuzzy rules stored in step (c) based on the calculated characteristic value of step (d) to obtain inference results;

(f) clustering the inference results into at least one cluster unit after selecting the sets of fuzzy rules in step (e);

(g) determining an integer value corresponding to a number of cluster units;

(h) defuzzificating each of the cluster units obtained in step (f) based on the integer value determined in step (g) for producing a separate real value for each of the cluster units; and (i) selecting an object belonging to a cluster unit having a real value defuzzificated in step (h) which is larger than other values defuzzificated in step (h) for each of the other cluster units, wherein the selected object is a layout pattern on the display.

* * * * *

UNITED STATES PATENT AND TRADEMARK OFFICE
CERTIFICATE OF CORRECTION

PATENT NO. : 6,539,365 B1
DATED : March 25, 2003
INVENTOR(S) : Kutsumi et al.

It is certified that error appears in the above-identified patent and that said Letters Patent is hereby corrected as shown below:

<u>Title page,</u>
Item [75], Inventors, "Hiroshi Kutsumi," delete "Moriguchi", insert -- Osaka --
"Kouji Miura," delete "Matsubara", insert -- Osaka --
Item [57], ABSTRACT,
Line 2, "a detecting", should read -- detecting --

Signed and Sealed this

Sixteenth Day of September, 2003

JAMES E. ROGAN
*Director of the United States Patent and Trademark Office*